(12) United States Patent
George

(10) Patent No.: US 11,155,389 B2
(45) Date of Patent: *Oct. 26, 2021

(54) BEVERAGE CONTAINER CLOSURE WITH VENTING

(71) Applicant: Pacific Market International, LLC, Seattle, WA (US)

(72) Inventor: Sarah Danger George, Vashon, WA (US)

(73) Assignee: Pacific Market international, LLC, Seattle, WA (US)

(*) Notice: Subject to any disclaimer, the term of this patent is extended or adjusted under 35 U.S.C. 154(b) by 169 days.

This patent is subject to a terminal disclaimer.

(21) Appl. No.: 16/431,263

(22) Filed: Jun. 4, 2019

(65) Prior Publication Data

US 2019/0283939 A1 Sep. 19, 2019

Related U.S. Application Data

(63) Continuation of application No. 15/386,641, filed on Dec. 21, 2016, now Pat. No. 10,351,313, which is a
(Continued)

(51) Int. Cl.
*A47G 19/22* (2006.01)
*B65D 43/26* (2006.01)
(Continued)

(52) U.S. Cl.
CPC ....... *B65D 43/267* (2013.01); *A47G 19/2272* (2013.01); *A47J 41/0022* (2013.01);
(Continued)

(58) Field of Classification Search
CPC .... B65D 39/0052; B65D 41/28; B65D 43/02; B65D 43/0225; B65D 51/18;
(Continued)

(56) References Cited

U.S. PATENT DOCUMENTS 118,860 A 9/1871 Kent
404,192 A 5/1889 Haas
(Continued)

FOREIGN PATENT DOCUMENTS

CN 2198839 Y 5/1995
CN 2210160 Y 10/1995
(Continued)

OTHER PUBLICATIONS

"Office Action dated Sep. 9, 2016," U.S. Appl. No. 15/159,098, filed May 19, 2016, 28 pages.
(Continued)

*Primary Examiner* — King M Chu
(74) *Attorney, Agent, or Firm* — George C. Rondeau, Jr.; Davis Wright Tremaine, LLP

(57) ABSTRACT

A beverage container closure or lid adapted for closing an open end of a beverage container. The lid is couplable to the beverage container and includes a selectively openable stopper that when closed, creates a fluid-tight seal between the beverage container and the environment. The stopper may be opened by pressing a button disposed on a side of the beverage container closure. The stopper is subsequently automatically closed when the button is released. Thus, the user may open and close the beverage container closure using a single hand without the need to remove the beverage container closure from the beverage container. The beverage container closure includes an actuating lever configured to press the button when a user applies a force to the lever. By utilizing the mechanical advantage provided by the lever, a user is able to selectively open and close the stopper using a relatively low amount of force.

78 Claims, 19 Drawing Sheets

Related U.S. Application Data continuation of application No. 15/159,098, filed on May 19, 2016, now Pat. No. 9,643,758, which is a continuation of application No. 14/616,558, filed on Feb. 6, 2015, now Pat. No. 9,364,110, which is a continuation of application No. 13/311,373, filed on Dec. 5, 2011, now Pat. No. 8,978,923.

(51) Int. Cl.
*A47J 41/00* (2006.01)
*B65D 41/28* (2006.01)
*B65D 39/00* (2006.01)
*B65D 43/02* (2006.01)
*B65D 43/16* (2006.01)
*B65D 51/18* (2006.01)

(52) U.S. Cl.
CPC ......... *B65D 39/0052* (2013.01); *B65D 41/28* (2013.01); *B65D 43/02* (2013.01); *B65D 43/0225* (2013.01); *B65D 43/16* (2013.01); *B65D 43/26* (2013.01); *B65D 51/18* (2013.01); *B65D 2251/009* (2013.01); *B65D 2251/0012* (2013.01); *B65D 2251/0028* (2013.01); *B65D 2251/0081* (2013.01); *B65D 2543/00046* (2013.01)

(58) Field of Classification Search
CPC ...... B65D 2251/009; B65D 2251/0081; B65D 2251/0028; B65D 2543/00046; A47G 19/2272
USPC .................................. 220/711, 715; 215/311
See application file for complete search history.

(56) References Cited

U.S. PATENT DOCUMENTS

| | | |
|---|---|---|
| 421,282 A | 2/1890 | Jackson |
| 599,389 A | 2/1898 | Jackson |
| 656,000 A | 8/1900 | Wall |
| 657,636 A | 9/1900 | Bingham |
| 768,355 A | 8/1904 | Bolen |
| 830,142 A | 9/1906 | Ebbing |
| 1,072,588 A | 9/1913 | Duncan |
| 1,284,728 A | 11/1918 | Wahl et al. |
| 1,311,373 A | 7/1919 | Barr |
| 1,316,949 A | 9/1919 | Gilbert et al. |
| 1,322,669 A | 11/1919 | Shepard et al. |
| 2,138,387 A | 11/1938 | Officer |
| 2,193,232 A | 3/1940 | Hacmac |
| 2,210,206 A | 8/1940 | Fisher |
| 2,274,849 A | 3/1942 | Peterson |
| 2,447,870 A | 8/1948 | Polcyn |
| 2,622,420 A | 12/1952 | Rice |
| 2,799,437 A | 7/1957 | Jepson |
| 2,884,157 A | 4/1959 | Lampkin |
| 3,050,219 A | 8/1962 | Sagarin |
| 3,059,816 A | 10/1962 | Goldstein |
| 3,096,897 A | 7/1963 | Hansen |
| 3,185,350 A | 5/1965 | Abplanalp |
| 3,325,054 A | 6/1967 | Braun |
| D209,483 S | 12/1967 | Frank |
| 3,422,996 A | 1/1969 | Lipman |
| 3,591,128 A | 7/1971 | Ramis |
| 3,635,380 A | 1/1972 | Fitzgerald |
| 3,722,748 A | 3/1973 | Wakeman et al. |
| 3,739,938 A | 6/1973 | Paz |
| 3,744,682 A | 7/1973 | Blank |
| 3,770,167 A | 11/1973 | Ewald |
| 3,964,631 A | 6/1976 | Albert |
| 3,967,748 A | 7/1976 | Albert |
| 3,972,443 A | 8/1976 | Albert |
| 4,057,167 A | 11/1977 | Lee |
| 4,065,036 A | 12/1977 | Kirk, Jr. |
| 4,094,433 A | 6/1978 | Numbers |
| 4,099,642 A | 7/1978 | Nergard |
| 4,127,221 A | 11/1978 | Vere |
| 4,133,446 A | 1/1979 | Albert |
| 4,136,799 A | 1/1979 | Albert |
| 4,171,060 A | 10/1979 | Howard et al. |
| 4,212,408 A | 7/1980 | Valenzona |
| 4,276,992 A | 7/1981 | Susich |
| 4,303,173 A | 12/1981 | Nergard |
| D274,984 S | 8/1984 | Thornell |
| D288,667 S | 3/1987 | Miner |
| 4,676,411 A | 6/1987 | Simasaki |
| D291,537 S | 8/1987 | Crawford et al. |
| 4,686,725 A | 8/1987 | Mitchell |
| 4,706,313 A | 11/1987 | Murphy |
| 4,711,372 A | 12/1987 | Gach |
| 4,712,704 A | 12/1987 | Ramsey et al. |
| 4,779,766 A | 10/1988 | Kinsley |
| 4,801,053 A | 1/1989 | Kaster |
| 4,834,270 A | 5/1989 | Messner |
| 4,852,770 A | 8/1989 | Sledge et al. |
| 4,865,228 A | 9/1989 | Landecker |
| 4,881,668 A | 11/1989 | Kitterman et al. |
| 4,901,387 A | 2/1990 | Luke |
| D315,872 S | 4/1991 | Bixler |
| 5,025,519 A | 6/1991 | Spann et al. |
| D318,427 S | 7/1991 | Sherburne, Jr. |
| 5,039,158 A | 8/1991 | Maier |
| 5,070,560 A | 12/1991 | Wilkinson |
| 5,082,134 A | 1/1992 | Ramsey |
| 5,118,014 A | 6/1992 | Hestehave et al. |
| 5,153,977 A | 10/1992 | Toida et al. |
| 5,163,196 A | 11/1992 | Graebe et al. |
| 5,167,016 A | 11/1992 | Bagley et al. |
| 5,169,016 A | 12/1992 | Hinz, Jr. |
| 5,179,742 A | 1/1993 | Oberle |
| 5,186,353 A | 2/1993 | Ramsey |
| 5,199,597 A | 4/1993 | Gladish |
| 5,222,623 A | 6/1993 | Eger et al. |
| 5,244,113 A | 9/1993 | Stymiest |
| 5,249,703 A | 10/1993 | Karp |
| 5,252,278 A | 10/1993 | Spann et al. |
| 5,307,950 A | 5/1994 | Li |
| 5,356,017 A | 10/1994 | Rohr et al. |
| D355,322 S | 2/1995 | Ackley et al. |
| 5,412,821 A | 5/1995 | Wilkinson |
| 5,427,271 A | 6/1995 | Wang |
| 5,461,741 A | 10/1995 | Graebe |
| 5,462,185 A | 10/1995 | Walker, III |
| 5,465,866 A | 11/1995 | Belcastro |
| 5,477,980 A | 12/1995 | Chaffin |
| 5,485,938 A | 1/1996 | Boersma |
| D367,611 S | 3/1996 | Wagner, III et al. |
| 5,495,966 A | 3/1996 | Won |
| D373,927 S | 9/1996 | Kramer et al. |
| D375,019 S | 10/1996 | Goto et al. |
| 5,570,797 A | 11/1996 | Yeh |
| 5,573,139 A | 11/1996 | Yeh |
| 5,580,504 A | 12/1996 | Spann et al. |
| 5,586,346 A | 12/1996 | Stacy et al. |
| 5,596,781 A | 1/1997 | Graebe |
| 5,606,754 A | 3/1997 | Hand et al. |
| 5,615,808 A | 4/1997 | Huang |
| 5,630,238 A | 5/1997 | Weismiller et al. |
| 5,649,331 A | 7/1997 | Wilkinson et al. |
| 5,652,985 A | 8/1997 | Wilkinson et al. |
| 5,666,681 A | 9/1997 | Meyer et al. |
| 5,680,951 A | 10/1997 | Feltman, III et al. |
| 5,689,845 A | 11/1997 | Sobieralski |
| D386,948 S | 12/1997 | Wissinger |
| 5,711,452 A | 1/1998 | Chaffin |
| D392,888 S | 3/1998 | Bakic |
| 5,753,289 A | 5/1998 | Ness |
| D394,778 S | 6/1998 | Arns et al. |
| D397,905 S | 9/1998 | Hsu |
| 5,845,352 A | 12/1998 | Matsler et al. |
| D404,613 S | 1/1999 | Hatsumoto et al. |
| D405,011 S | 2/1999 | DeCoster et al. |
| D406,006 S | 2/1999 | Hatsumoto et al. |

(56) References Cited

U.S. PATENT DOCUMENTS

| | | |
|---|---|---|
| D407,313 S | 3/1999 | Wadsworth et al. |
| D408,221 S | 4/1999 | Asberg |
| 5,918,854 A | 7/1999 | Barrash et al. |
| 5,944,235 A | 8/1999 | Won |
| D416,755 S | 11/1999 | Trombly |
| 5,987,668 A | 11/1999 | Ackley |
| D417,360 S | 12/1999 | Bickert et al. |
| 6,003,711 A | 12/1999 | Bilewitz |
| 6,010,029 A | 1/2000 | Wang |
| 6,036,271 A | 3/2000 | Wilkinson et al. |
| 6,053,474 A | 4/2000 | Stucke, Jr. et al. |
| 6,098,834 A | 8/2000 | Matsumoto et al. |
| 6,102,244 A | 8/2000 | Kuwano |
| 6,116,476 A | 9/2000 | Huang |
| 6,119,291 A | 9/2000 | Osborne et al. |
| 6,126,035 A | 10/2000 | Schaper et al. |
| 6,158,608 A | 12/2000 | Schlattl |
| RE37,016 E | 1/2001 | Morano |
| D437,229 S | 2/2001 | Andrew |
| 6,223,369 B1 | 5/2001 | Maier et al. |
| 6,276,560 B1 | 8/2001 | Belcastro |
| D447,693 S | 9/2001 | Warner et al. |
| 6,324,709 B1 | 12/2001 | Ikeda et al. |
| 6,351,863 B1 | 3/2002 | Meyer et al. |
| 6,352,166 B1 | 3/2002 | Copeland |
| 6,401,990 B1 | 6/2002 | Walters et al. |
| D460,894 S | 7/2002 | Ziegenfus et al. |
| 6,443,325 B1 | 9/2002 | Schaper et al. |
| 6,471,085 B1 | 10/2002 | Gallo |
| D470,009 S | 2/2003 | Turchi et al. |
| D471,808 S | 3/2003 | de Castro Couto |
| 6,557,717 B1 | 5/2003 | Keck |
| D476,230 S | 6/2003 | Braaten et al. |
| 6,601,735 B2 | 8/2003 | Milian et al. |
| 6,623,080 B2 | 9/2003 | Clapper |
| 6,626,314 B1 | 9/2003 | McHenry et al. |
| D480,268 S | 10/2003 | Laib |
| 6,644,490 B2 | 11/2003 | Clarke |
| 6,679,397 B2 | 1/2004 | Smith et al. |
| 6,695,171 B2 | 2/2004 | Walters et al. |
| 6,701,556 B2 | 3/2004 | Romano et al. |
| 6,702,137 B1 | 3/2004 | Kowa et al. |
| D489,257 S | 5/2004 | Braaten et al. |
| 6,732,875 B2 | 5/2004 | Smith et al. |
| 6,732,876 B2 | 5/2004 | Belcastro |
| 6,732,964 B2 | 5/2004 | Couchey |
| 6,763,964 B1 | 7/2004 | Hurlbut et al. |
| 6,782,574 B2 | 8/2004 | Totton et al. |
| 6,824,003 B1 | 11/2004 | Wong |
| D500,428 S | 1/2005 | Ward et al. |
| 6,854,615 B2 | 2/2005 | von Ronn et al. |
| D502,844 S | 3/2005 | Rohe |
| 6,874,185 B1 | 4/2005 | Phillips et al. |
| 6,901,617 B2 | 6/2005 | Sprouse, II et al. |
| D508,185 S | 8/2005 | Gauss |
| 6,922,863 B2 | 8/2005 | Giori et al. |
| 6,928,681 B1 | 8/2005 | Stacy |
| 6,935,536 B2 | 8/2005 | Tardif |
| 6,952,852 B2 | 10/2005 | Reeder et al. |
| 6,976,281 B2 | 12/2005 | Schunk et al. |
| 6,978,910 B2 | 12/2005 | Sanders et al. |
| D513,452 S | 1/2006 | Parve |
| 7,011,227 B2 | 3/2006 | Ward et al. |
| D522,794 S | 6/2006 | Imai |
| D523,340 S | 6/2006 | Westphal |
| 7,073,678 B1 | 7/2006 | Dibdin et al. |
| D526,898 S | 8/2006 | Isono et al. |
| D526,899 S | 8/2006 | Mangin et al. |
| 7,086,107 B2 | 8/2006 | Ellis et al. |
| D529,379 S | 10/2006 | Mengeu et al. |
| D529,761 S | 10/2006 | Trombly |
| D532,300 S | 11/2006 | Moretti |
| D533,064 S | 12/2006 | Glynn et al. |
| 7,195,137 B2 | 3/2007 | Belcastro |
| D540,625 S | 4/2007 | Sandberg |
| 7,201,288 B2 | 4/2007 | von Ronn et al. |
| D541,572 S | 5/2007 | Watanabe |
| D544,300 S | 6/2007 | Tien |
| 7,229,134 B2 | 6/2007 | Ito |
| D547,122 S | 7/2007 | Gluck |
| D547,611 S | 7/2007 | Seum et al. |
| D548,008 S | 8/2007 | Lin |
| D548,508 S | 8/2007 | Tonelli |
| D552,990 S | 10/2007 | Vogel |
| 7,275,653 B2 | 10/2007 | Tedford, Jr. |
| D554,433 S | 11/2007 | Gluck |
| D554,992 S | 11/2007 | Mangin et al. |
| D555,000 S | 11/2007 | Bunce et al. |
| D555,514 S | 11/2007 | Munn |
| D555,970 S | 11/2007 | Schreitmueller et al. |
| D558,111 S | 12/2007 | Banks, III |
| D560,435 S | 1/2008 | Meehan |
| D564,840 S | 3/2008 | Williams |
| D564,841 S | 3/2008 | Clemens et al. |
| D564,874 S | 3/2008 | Mangin et al. |
| D569,182 S | 5/2008 | Homma |
| D572,531 S | 7/2008 | Romandy et al. |
| D573,017 S | 7/2008 | Henderson |
| D573,404 S | 7/2008 | Wahl |
| 7,413,096 B2 | 8/2008 | Morgan et al. |
| D577,582 S | 9/2008 | Walsh et al. |
| D577,958 S | 10/2008 | Homma |
| D581,279 S | 11/2008 | Oates |
| D581,727 S | 12/2008 | Pinelli et al. |
| D584,107 S | 1/2009 | George |
| D585,698 S | 2/2009 | Trombly |
| D587,060 S | 2/2009 | Tong Chi Chung |
| D587,969 S | 3/2009 | Gilbert |
| D588,411 S | 3/2009 | Watanabe |
| D589,750 S | 4/2009 | Liu et al. |
| 7,513,380 B2 | 4/2009 | Canedo |
| D592,012 S | 5/2009 | Carreno |
| D592,456 S | 5/2009 | Pinelli et al. |
| D592,505 S | 5/2009 | Mobley et al. |
| D592,905 S | 5/2009 | Pinelli et al. |
| D592,913 S | 5/2009 | Pinelli et al. |
| 7,546,933 B2 | 6/2009 | Pinelli |
| D603,704 S | 11/2009 | Jost et al. |
| 7,611,029 B2 | 11/2009 | Wong |
| D606,364 S | 12/2009 | Gilbert et al. |
| D609,054 S | 2/2010 | Gilbert |
| D610,874 S | 3/2010 | Gilbert et al. |
| D611,764 S | 3/2010 | Wahl et al. |
| D613,160 S | 4/2010 | Ablo |
| D623,473 S | 9/2010 | Chen |
| D623,474 S | 9/2010 | Carlson et al. |
| D623,476 S | 9/2010 | Carlson et al. |
| D625,146 S | 10/2010 | George et al. |
| D629,653 S | 12/2010 | Gullickson et al. |
| D634,161 S | 3/2011 | Roth et al. |
| RE42,484 E | 6/2011 | Kitamura et al. |
| D640,094 S | 6/2011 | Carlson et al. |
| D643,245 S | 8/2011 | Minarsch |
| 7,997,442 B2 | 8/2011 | Pinelli |
| D648,985 S | 11/2011 | Chiu et al. |
| 8,056,745 B2 | 11/2011 | Yu |
| D656,787 S | 4/2012 | Phillips et al. |
| D658,443 S | 5/2012 | Chiu et al. |
| D659,473 S | 5/2012 | Ghiassi |
| D662,360 S | 6/2012 | George |
| 8,297,462 B1 | 10/2012 | Joyce |
| 8,360,258 B2 | 1/2013 | Gilbert et al. |
| 8,360,267 B1 | 1/2013 | Chiou et al. |
| D675,873 S | 2/2013 | Miller et al. |
| D676,278 S | 2/2013 | Wong |
| 8,376,162 B2 | 2/2013 | Yang |
| 8,403,173 B2 | 3/2013 | Wahl et al. |
| 8,418,992 B2 | 4/2013 | Meyer et al. |
| 8,459,510 B2 | 6/2013 | Richards et al. |
| 8,464,895 B2 | 6/2013 | Gilbert et al. |
| D686,074 S | 7/2013 | Brinckerhoff et al. |
| 8,573,431 B2 | 11/2013 | Shepard et al. |
| 8,622,229 B2 | 1/2014 | Lane |
| D700,807 S | 3/2014 | Kershaw et al. |

(56) References Cited

U.S. PATENT DOCUMENTS

| | | | |
|---|---|---|---|
| 8,727,176 | B2 | 5/2014 | El-Saden et al. |
| 8,746,496 | B2 | 6/2014 | Gilbert et al. |
| 8,844,762 | B2 | 9/2014 | Chiou et al. |
| 8,863,979 | B2 | 10/2014 | El-Saden et al. |
| D721,250 | S | 1/2015 | Chen et al. |
| 8,978,923 | B2 | 3/2015 | George |
| D732,892 | S | 6/2015 | Keys et al. |
| 9,113,698 | B2 | 8/2015 | Blain et al. |
| 9,375,107 | B2 | 6/2016 | Gilbert et al. |
| 9,808,101 | B2 | 11/2017 | Chiou et al. |
| 2002/0033400 | A1 | 3/2002 | Rohrer et al. |
| 2003/0071041 | A1 | 4/2003 | Vogel |
| 2003/0102338 | A1 | 6/2003 | Martin |
| 2004/0040962 | A1 | 3/2004 | Bielecki et al. |
| 2004/0217139 | A1 | 11/2004 | Roth et al. |
| 2005/0028289 | A1 | 2/2005 | Hakamiun |
| 2005/0029265 | A1 | 2/2005 | Morgan et al. |
| 2006/0043091 | A1 | 3/2006 | Pinelli et al. |
| 2006/0081633 | A1 | 4/2006 | Schmidtner et al. |
| 2006/0096983 | A1 | 5/2006 | Patterson |
| 2006/0113327 | A1 | 6/2006 | Walters et al. |
| 2006/0175331 | A1 | 8/2006 | Lin et al. |
| 2006/0226160 | A1 | 10/2006 | Elsaden et al. |
| 2007/0170184 | A1 | 7/2007 | Canedo |
| 2007/0210093 | A1* | 9/2007 | Pinelli .................. B65D 43/26 220/715 |
| 2007/0241134 | A1 | 10/2007 | Gurrisi et al. |
| 2008/0156817 | A1 | 7/2008 | Roseblade et al. |
| 2008/0237233 | A1 | 10/2008 | Choi et al. |
| 2008/0272134 | A1 | 11/2008 | Rohe |
| 2010/0206835 | A1 | 8/2010 | Yu |
| 2011/0132908 | A1 | 5/2011 | Meehan |
| 2011/0309095 | A1 | 12/2011 | Pinelli |
| 2012/0285961 | A1 | 11/2012 | Roth et al. |
| 2013/0119060 | A1 | 5/2013 | Chiou et al. |
| 2013/0140309 | A1 | 6/2013 | George |
| 2014/0197170 | A1 | 7/2014 | Carlile et al. |
| 2015/0164255 | A1 | 6/2015 | Coon et al. |
| 2016/0198878 | A1 | 7/2016 | Gilbert et al. |
| 2016/0264308 | A1 | 9/2016 | Gilbert et al. |
| 2016/0264309 | A1 | 9/2016 | Gilbert et al. |
| 2016/0264310 | A1 | 9/2016 | Gilbert et al. |
| 2016/0264311 | A1 | 9/2016 | Gilbert et al. |
| 2017/0101231 | A1 | 4/2017 | George |

FOREIGN PATENT DOCUMENTS

| | | |
|---|---|---|
| CN | 1245766 A | 3/2000 |
| CN | 1299317 A | 6/2001 |
| CN | 1345682 A | 4/2002 |
| CN | 1432512 A | 7/2003 |
| CN | 1636835 A | 7/2005 |
| CN | 2866364 Y | 2/2007 |
| DE | 3402894 A1 | 8/1985 |
| DE | 20003371 U1 | 4/2000 |
| DE | 202011002273 U1 | 4/2011 |
| EP | 1182147 A2 | 2/2002 |
| JP | S55027429 A | 2/1980 |
| JP | S58043329 A | 3/1983 |
| JP | S62131622 U | 8/1987 |
| JP | H9150852 A | 6/1997 |
| JP | H11001258 A | 1/1999 |
| JP | 2005193944 A | 7/2005 |
| JP | 2005278855 A | 10/2005 |
| JP | 2009279332 A | 12/2009 |
| JP | 3171259 U | 10/2011 |
| KR | 2019980061202 | 11/1998 |
| WO | 0034143 A1 | 6/2000 |
| WO | 2000045684 A1 | 8/2000 |
| WO | 2005115204 A1 | 12/2005 |
| WO | 2010085367 A1 | 7/2010 |

OTHER PUBLICATIONS

Extended European Search Report dated Jan. 22, 2013, European Patent Application No. 12183461.8, filed Sep. 7, 2012, eight pages.
Extended European Search Report dated Mar. 18, 2013, European Patent Application No. 12195654.4, filed Dec. 5, 2012, seven pages.
Extended European Search Report dated Oct. 18, 2012, European Patent Application No. 12173632.6, four pages.
George, "Beverage Container Closure With Venting," U.S. Appl. No. 13/311,373, filed Dec. 5, 2011.
Gilbert et al., "Beverage Container Closure (Mercury One Hand Push Button Lid)," U.S. Appl. No. 12/946,501, filed Nov. 15, 2010.
Gilbert et al., "Beverage Container With One-Handed Operation," U.S. Appl. No. 13/169,249, filed Jun. 27, 2011.
International Preliminary Report on Patentability for related International Application No. PCT/US2012/064801, dated May 20, 2014.
International Search Report and Written Opinion dated May 21, 2012, International Patent Application No. PCT/US2011/060042, 13 pages.
Shepard et al., "Beverage Container Closure With Venting," U.S. Appl. No. 13/226,669, filed Sep. 7, 2011.
Wahl et al., "Beverage Container Closure," U.S. Appl. No. 12/847,028, filed Jul. 30, 2010.

* cited by examiner

BEVERAGE CONTAINER CLOSURE WITH VENTING

BACKGROUND OF THE INVENTION

Field of the Invention

The present invention is directed generally to lids for liquid storage vessels such as for beverage or food containers and more particularly to lids with movable components that include an actuating lever and pressure-venting features.

Description of the Related Art

Prior art lids are typically of one of three types. The first type is a solid unitary lid that does not include openings or apertures through which the contents of a liquid storage vessel may exit the vessel. To drink from the vessel, a user must remove the lid. The second type, which may also be of a unitary construction, includes one or more unobstructed apertures through which the liquid may exit the vessel. In the second type, the apertures are always open. If the vessel is inadvertently tipped or dropped, the contents of the vessel may spill. The third type of lid includes one or more apertures through which the liquid may exit the vessel and a means for selectively opening and closing the apertures. When using the third type of lid, the user may selectively open the apertures to remove the contents from the vessel and selectively close the apertures to maintain the contents inside the vessel. Further, by closing the apertures, the lid may help insulate the contents from the environment outside the vessel.

DETAILED DESCRIPTION OF THE INVENTION

Overview

Embodiments of the present invention are directed to beverage container closures or lids that are adapted for closing an open end of a beverage container. The lids are selectively couplable to the beverage container and include a selectively openable stopper that when closed, creates a fluid-tight seal between the beverage container and the environment. A user pressing a button disposed on a side of the beverage container closure may selectively open the stopper. The stopper is subsequently automatically closed when the user releases the button. Thus, the user may open and close the beverage container closure using a single hand without the need to remove the beverage container closure from the beverage container.

The beverage container closures described herein include an actuating lever configured to press the button when a user applies an inward force to the lever. By utilizing the mechanical advantage provided by the lever, a user is able to selectively open and close the stopper using a relatively low amount of hand force compared to directly pressing the button. This feature can be desirable for users that are not able or do not wish to use a relatively large amount of force to open the stopper of the beverage container closure by pressing directly on a relatively small button. The operation of the actuating lever is discussed below with reference primarily to FIGS. 8A, 8B, 8C, and 8D.

Embodiments of the present invention are also directed to systems and methods for providing pressure venting for a beverage container closure or lid. When a hot liquid such as coffee is stored in a closed beverage container, the pressure inside the beverage container builds. Due to this pressure, for some beverage containers there is a potential for liquid or gas to be expelled or spray from an opening in the beverage container when it is opened by a user (e.g., for drinking from the beverage container). Embodiments of the invention disclosed herein are also directed to venting mechanisms for beverage container closures that prevent the spray of liquid or gas from a drink hole or vent hole of beverage container closures when the beverage container closures are opened by a user (e.g., to drink a beverage therefrom). Initially, with reference to FIGS. 1-12, a beverage container closure or lid that includes an exemplary venting mechanism is described generally. Afterward, with reference to FIGS. 13A, 13B, 13C, and 13D, the venting mechanism of the beverage container closure is described in detail.

Beverage Container Closure

Figure 1:
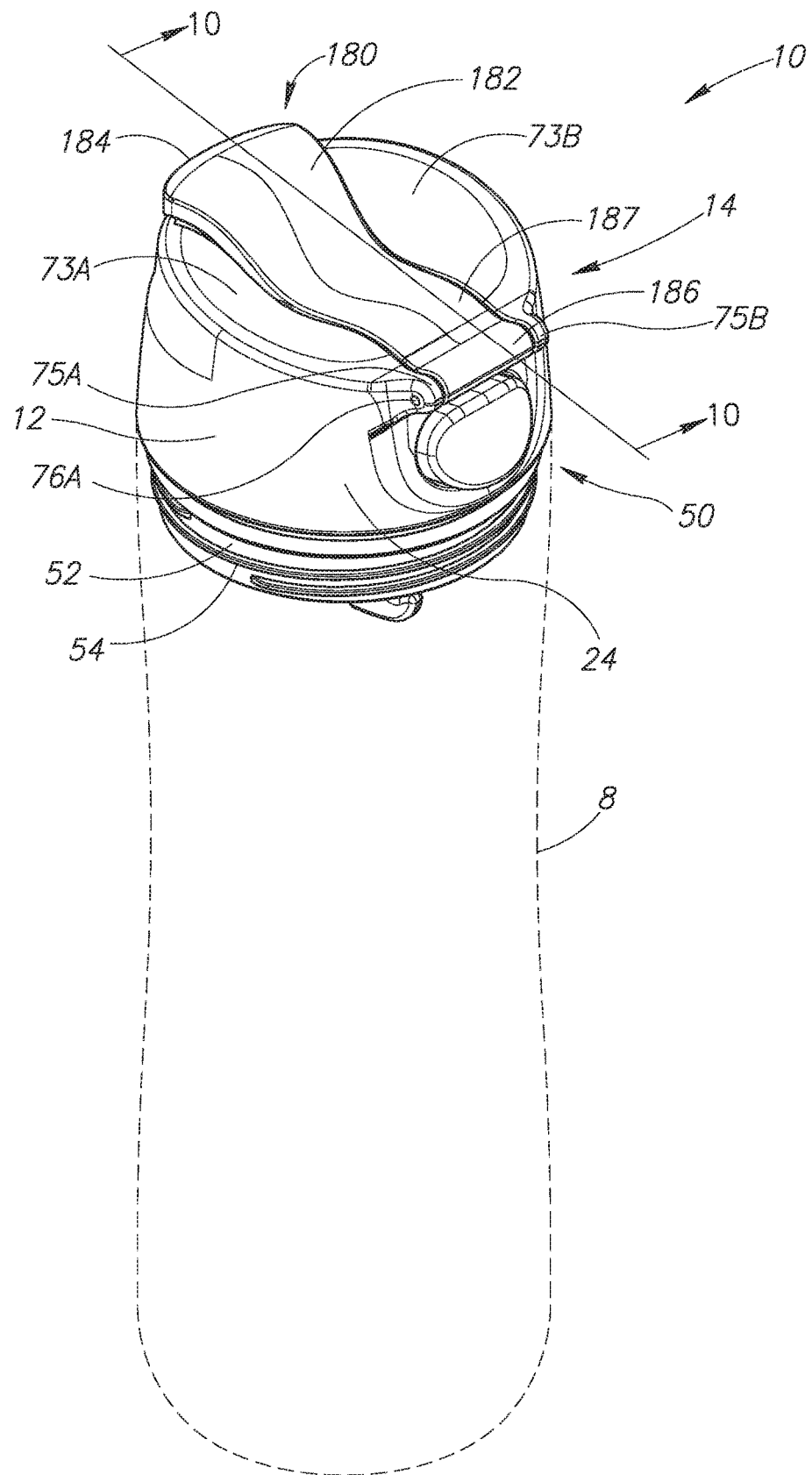
FIG. 1 is a top right side perspective view of a beverage container closure having a lever selectively disposed in a cover position to cover a drinking opening in the beverage container closure.

A beverage container closure or lid, in accordance with an embodiment of the present invention, is generally indicated by reference numeral 10 in FIG. 1. The lid 10 has a generally cylindrical main body 12 that is adapted for closing an open end of a conventional drinking vessel or beverage container 8 (shown in dashed lines for illustrative purposes). The beverage container 8 may be any suitable type of container such as the tumbler type (that is, without a handle) for use in automotive beverage receptacles, or for transport in backpacks, book bags, and the like. The lid 10 is selectively couplable to the beverage container 8 by any suitable means such as threads 54 disposed on an outer surface of a sidewall 52 of a lower, downwardly depending portion 50 of the main body 12. The lid 10 also includes a flexible O-ring seal member 56 (see FIG. 2) positioned adjacent the sidewall 52 of the lower portion 50 at a location near a bottom surface of an upper portion 14 of the main body 12. The particular configuration for mating the lid 10 to the container 8 is a matter of choice for one of ordinary skill in the art. Thus, although threads 54 and the seal member 56 have been shown in this embodiment, those of ordinary skill in the art will appreciate that any other means for attaching and sealing the lid 10 with respect to the beverage container 8 may be substituted.

Figure 8A:
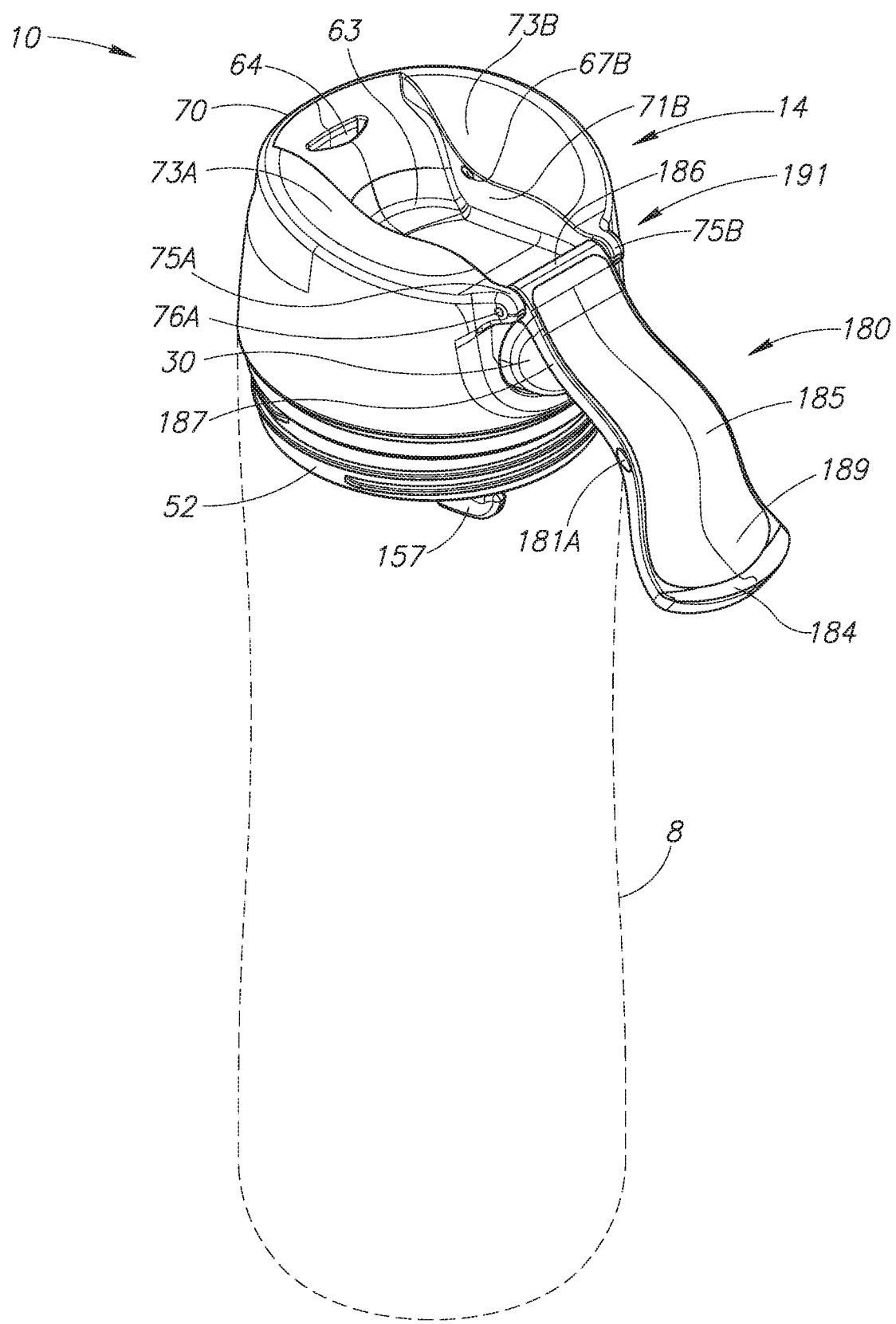
FIG. 8A is a top right side perspective view of the beverage container closure of FIG. 1 with the lever rotated away from the drinking opening and into an actuating position to provide a user with access to the drinking opening.
Figure 8B:
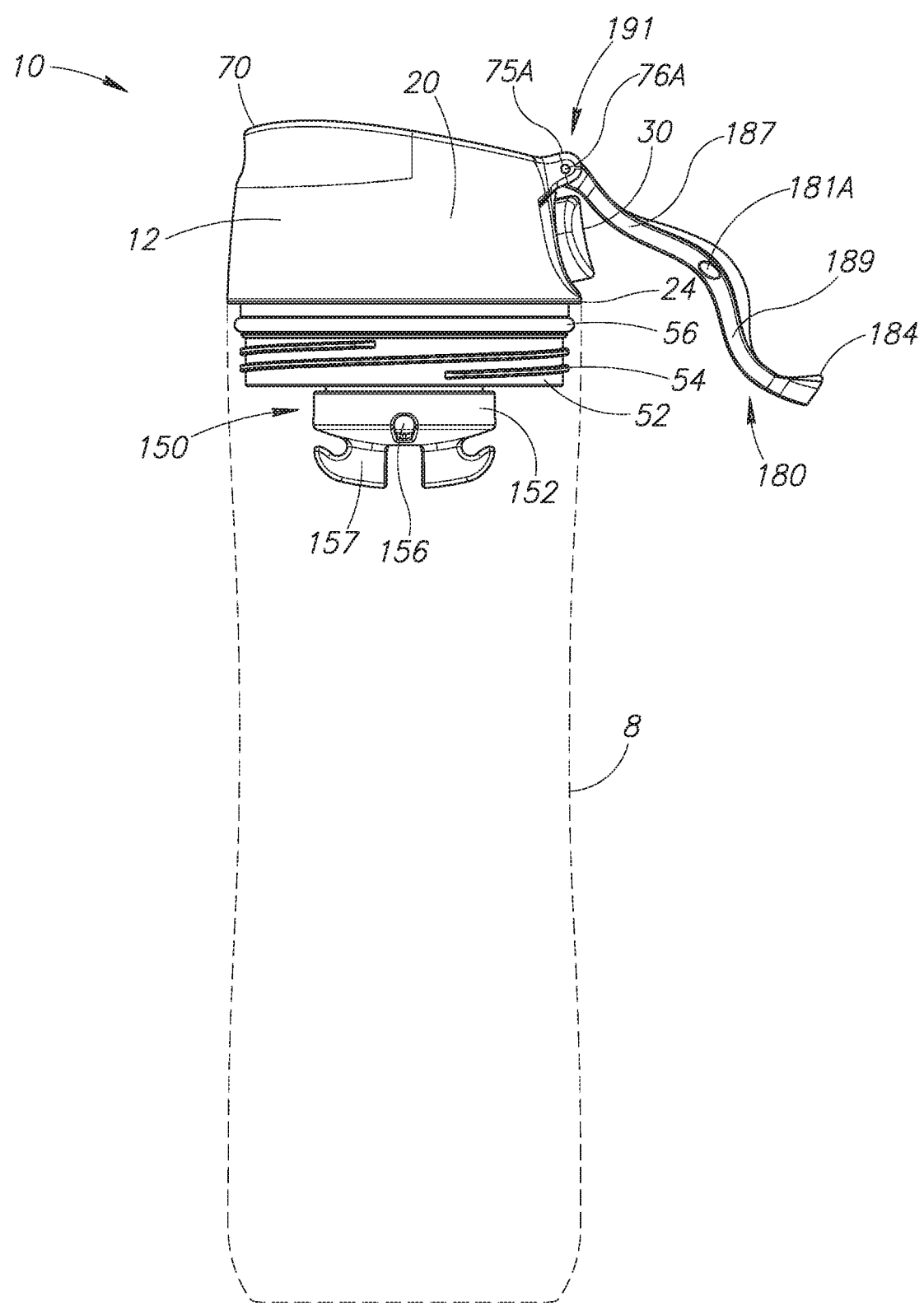
FIG. 8B is a right side elevational view of the beverage container as shown in FIG. 8A.

As best seen in FIG. 8A, the upper portion 14 of the main body 12 also includes a forward lip portion 70 configured for contact with a user's lips when the entire assembly is tipped toward the user, such that the user may drink from the beverage container 8 to which the lid 10 is attached. The upper portion 14 also includes an aperture or drinking opening 64 configured to permit fluid passage therethrough when a user drinks a beverage.

Figure 12:
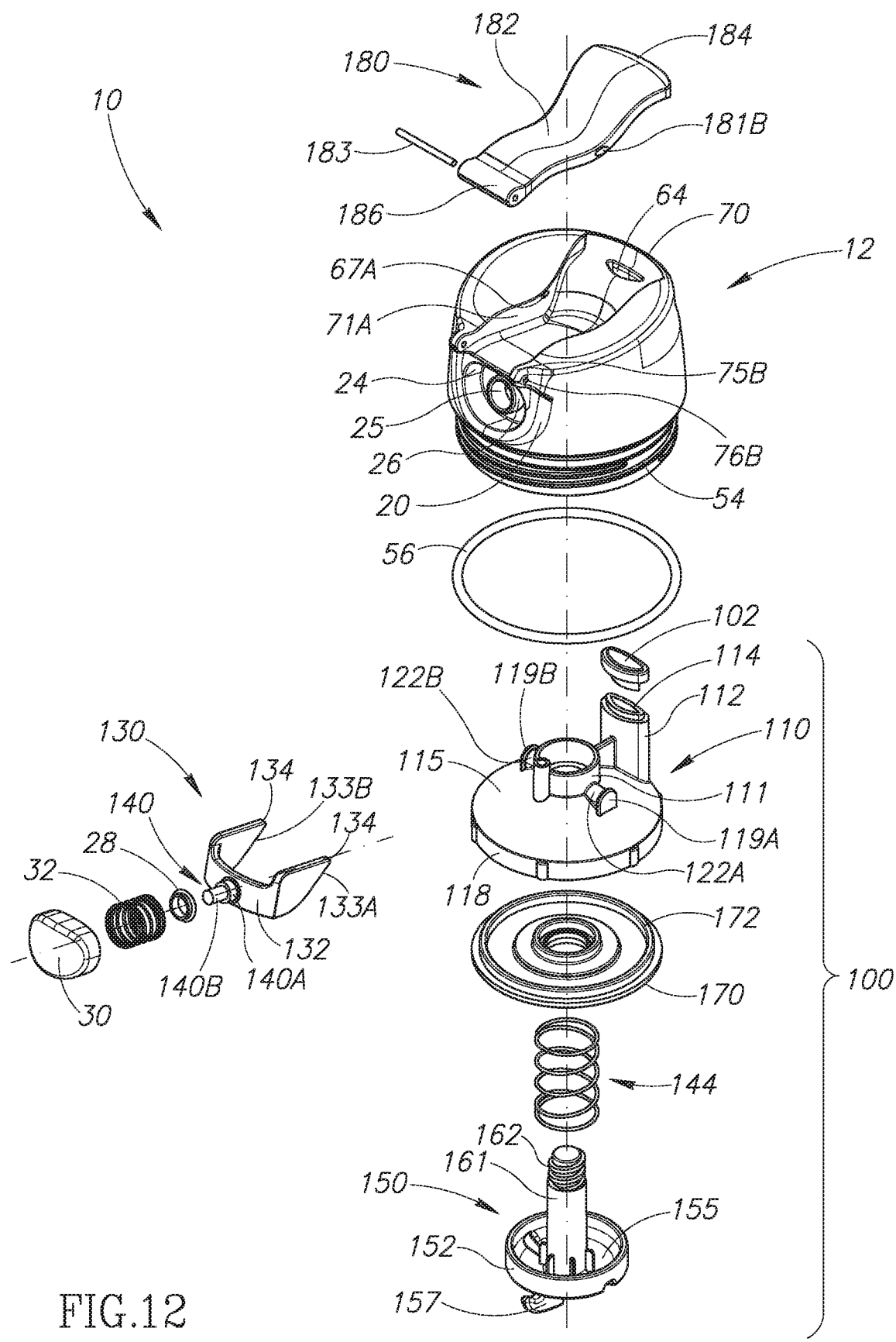
FIG. 12 is an enlarged, exploded perspective view of a stopper assembly of the beverage container closure of FIG. 1.

Fluid communication between the upper portion 14 and the interior of the beverage container 8 is controlled by way of a selectively openable stopper assembly 100, which may best be viewed in FIG. 12. The stopper assembly 100 includes a stopper 110 having a raised portion 112 configured for attachment of a stopper seal 102 thereto (e.g., by a press fit). The stopper seal 102 may be formed from a flexible material and is shaped to be positioned over a top surface 114 of the raised portion 112. Below the raised portion 112 of the stopper 110 is an angled base or body portion 115. Further, extending in a downward direction from the body portion 115 of the stopper 110 is a circumferential sidewall 118. The sidewall 118 is configured to engage a stopper cap 170.

The stopper 110 also comprises an upwardly extending cylindrical wall 111 (see FIGS. 10 and 12) sized to be slightly larger than a downwardly extending cylindrical wall 13 of the upper portion 14 of the main body 12, such that the walls 13 and 111 may move axially freely in telescoping fashion with respect to each other when the lid 10 is operated by a user as described below. The stopper 110 also includes a pair of spaced apart cam followers 119A and 119B having respective cam follower surfaces 122A and 122B (see FIGS. 12, 13B, 13C, and 13D) disposed on the base portion 115 of the stopper on opposing sides of the upwardly extending cylindrical wall 111. The functionality of the cam followers 119A and 119B is described herein below.

Figure 10:
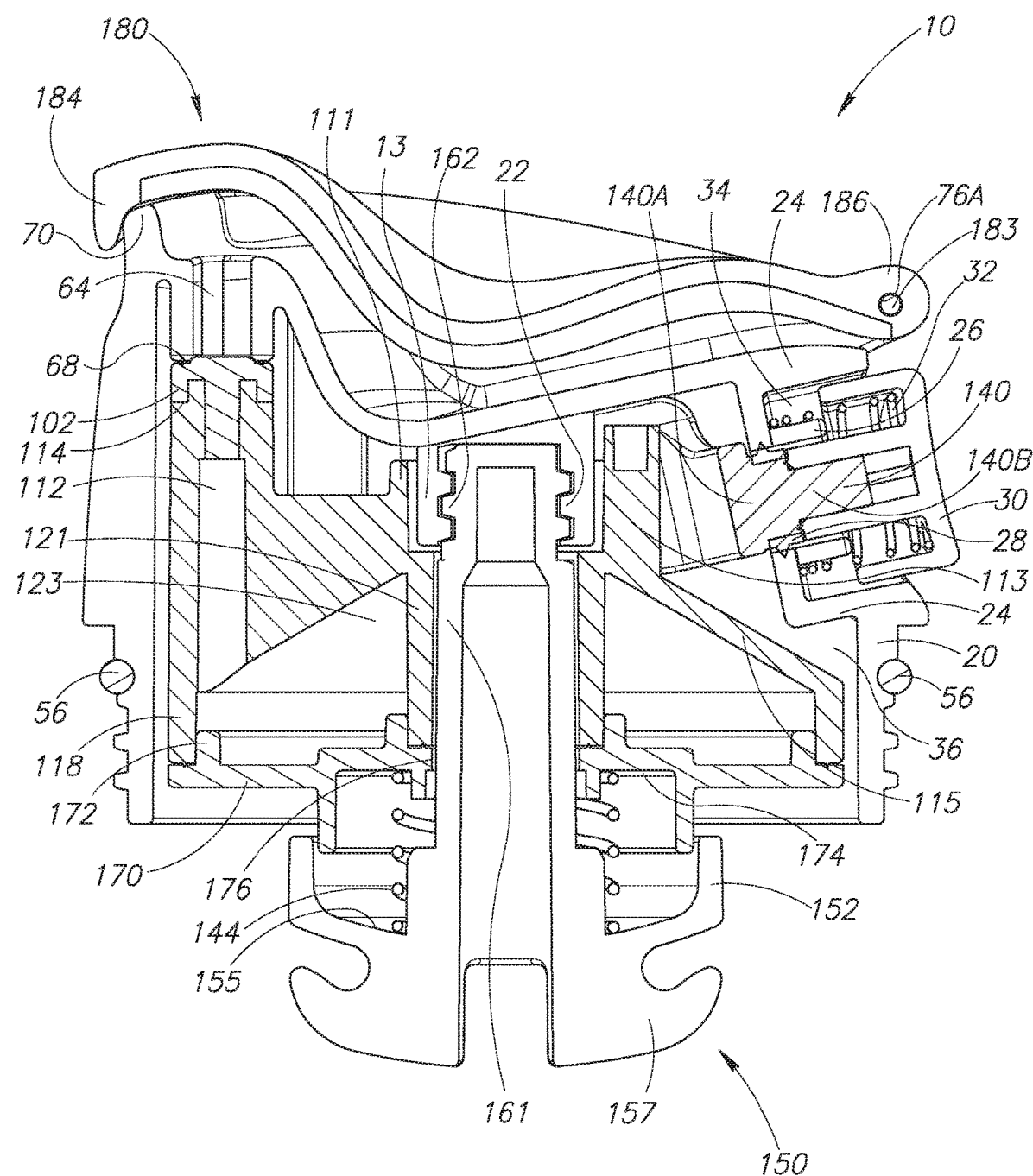
FIG. 10 is an enlarged cross-sectional right side elevational view of the beverage container closure of FIG. 1 taken substantially along the line 10-10 of FIG. 1.

As may best be viewed in FIG. 10, the stopper cap 170 includes a raised portion 172 configured to fit within the circumferential sidewall 118 of the stopper 110. The stopper cap 170 further includes an opening defined by an annular-shaped edge 176, and a bottom surface 174. These features are described below. When the stopper cap 170 is coupled to the stopper 110, an interior hollow region 123 is formed. To provide insulation between the interior of the beverage container 8 and the environment, an insulating substance, such as a ring of styrene, may be placed within the interior hollow region 123 of the stopper 110. The stopper cap 170 may be fixedly or removably coupled to the stopper 110.

The stopper assembly 100 also includes a stopper cover 150 (see FIGS. 10 and 12) configured for retaining the stopper assembly within a hollow interior region 36 of the main body 12. The stopper cover 150 includes a base portion 152 including multiple spaced apart apertures or openings 156 (see FIG. 3) disposed therein to allow for fluid passage therethrough. Further, the stopper cover 150 comprises an upwardly extending substantially cylindrically-shaped rod 161 terminating with an engagement portion 162 with external threads. As shown, the rod 161 passes through the opening defined by the annular-shaped edge 176 in the stopper cap 170, and through a downwardly extending cylindrical wall 121 of the stopper 110, where it is threadably engaged with an interiorly threaded stopper cover engagement portion 22 of the downwardly extending cylindrical wall 13 of the upper portion 14 of the main body 12, thereby securing the stopper cover 150 (and the other components of the stopper assembly 100) to the main body 12 of the lid 10. Stopper cover handles 157 are provided so a user can easily grip and rotate the stopper cover 150 to threadably engage the rod 161 with the stopper cover engagement portion 22.

As may best be viewed in FIG. 10, the stopper assembly 100 further includes a stopper biasing member 144 (in the illustrated embodiment, a spring) configured for biasing the stopper 110 upward into the closed position which provides a fluid-tight seal for the lid 10. The stopper biasing member 144 is sized to have a diameter that is slightly larger than the upwardly extending substantially cylindrically-shaped rod 161 of the stopper cover 150, such that the stopper biasing member may be positioned over the rod 161 and between a top surface 155 of the base portion 152 of the stopper cover 150 and an inner bottom surface 174 of the stopper cap 170 (see FIG. 10).

Figure 11A:
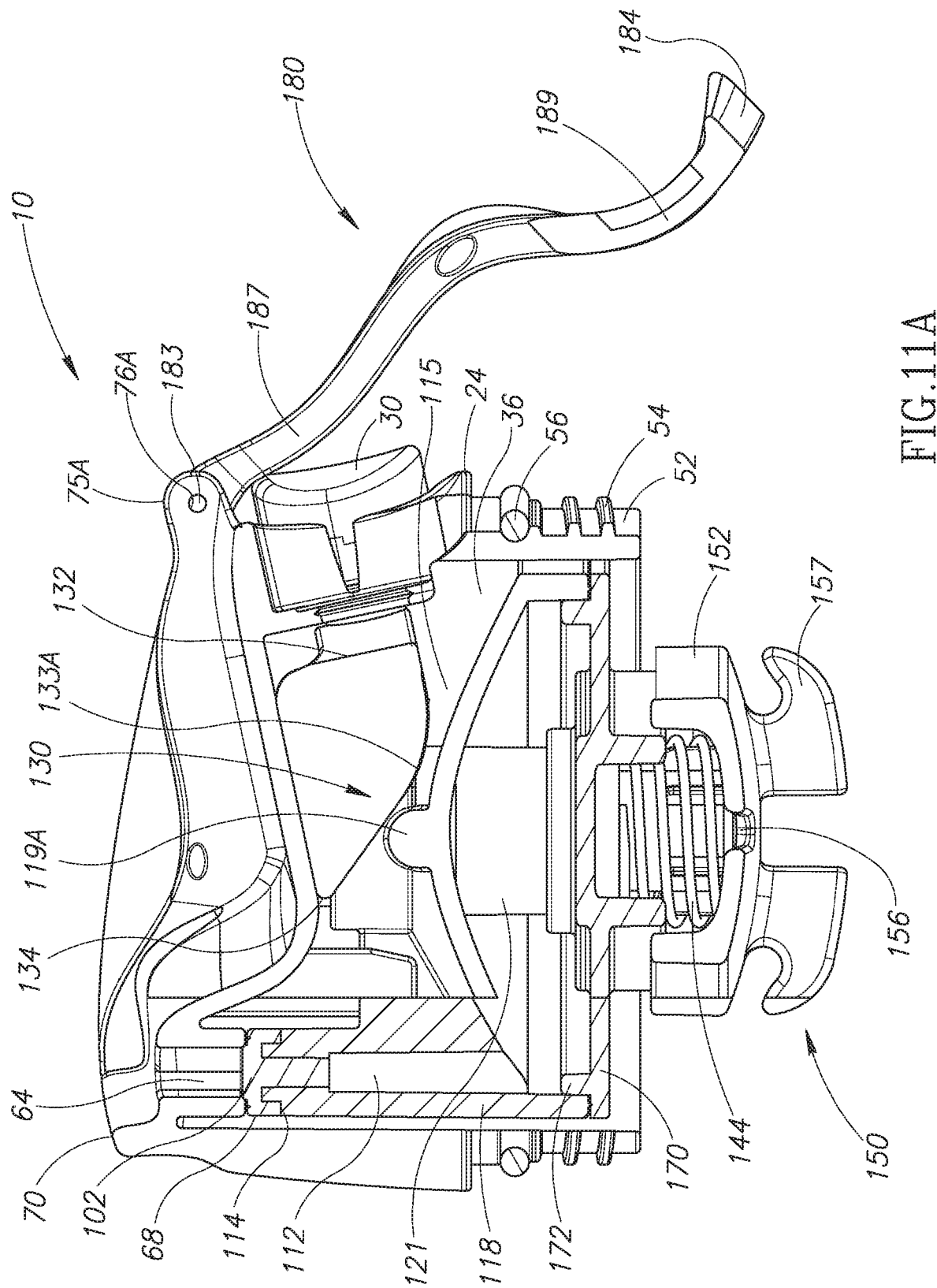
FIG. 11A is a sectional view taken substantially along the line 11A-11A of FIG. 9 with the stopper in the closed position.
Figure 11B:
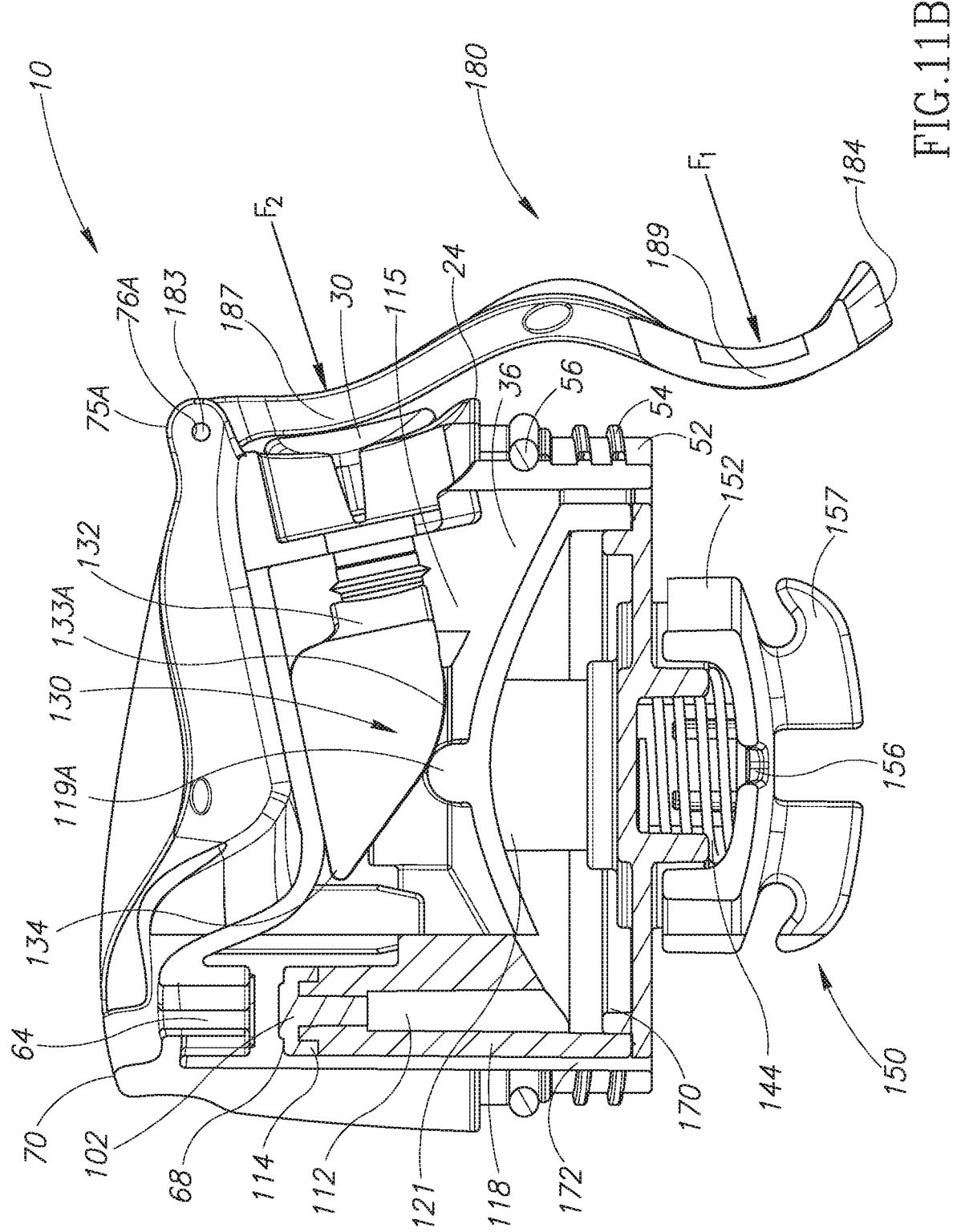
FIG. 11B is a sectional view taken substantially along the line 11B-11B of FIG. 9 with the stopper in the opened position.

As may best be viewed in FIGS. 11A, 11B, and 12, the stopper assembly 100 further includes an actuating member 130 configured for acting on the cam followers 119A and 119B of the stopper 110 to selectively move the stopper between the opened position and the closed position. The actuating member 130 includes first and second cam surfaces 133A and 133B (or "stopper engagement portions") spaced apart from each other and configured for slidable engagement with the first and second cam followers 119A and 119B (or "actuating member engagement portions"), respectively, of the stopper 110. The cam surfaces 133A and 133B are each ramp-shaped and are angled downward from a distal end 134 toward a proximal end 132 of the actuating member 130 (see FIGS. 11A and 11B). As described below, the cam surfaces 133A and 133B engage the surfaces of the cam followers 119A and 119B, respectively, to move the stopper 110 between the upward closed and lowered opened positions (shown in FIGS. 11A and 11B, respectively).

The actuating member 130 further includes a rod 140 (see FIG. 12) disposed at the proximal end 132 having a base portion 140A and a button coupling portion 140B. The button coupling portion 140B of the rod 140 is sized and shaped to be inserted (e.g., press fit) into a recessed portion of a button 30 (see FIG. 10) configured to permit a user to actuate the actuating member 130 by simply pressing the button inward or by applying a force to a lever 180 to press the button inward, as will be discussed below. Further, as discussed in detail below, a venting wiper seal member 28 (see FIGS. 10, 12, and 13B-D) is disposed around the base portion 140A of the rod 140.

The operation of the stopper assembly 100 is now described with reference to FIGS. 11A and 11B, which show cut-away right side elevational views of the lid 10 when the stopper 110 is in the sealed or closed position (FIG. 11A) and the opened position (FIG. 11B). As can be seen, the stopper assembly 100 is positioned within the hollow interior region 36 of the main body 12. The engagement portion 162 of the stopper cover 150 is engaged with the stopper cover engagement portion 22 of the downwardly extending cylindrical wall 13 of the upper portion 14 disposed in the hollow interior region 36 of the main body 12 (see FIG. 10). For example, the stopper cover 150 may be threadably engaged with the main body 12 to retain the stopper cover and the other components of the stopper assembly 100.

As shown in FIG. 11A, the stopper seal 102 is in sealing contact with the stopper seal engagement portion 68 that defines the drinking opening 64 of the main body 12. In this regard, when the stopper 110 is in the closed position shown in FIG. 11A, the stopper seal 102 is pressed against the stopper seal engagement portion 68 of the main body 12 by the biasing member 144 to provide a fluid-tight seal between the container 8 to which the lid 10 is attached and the environment.

The actuating member 130 is situated such that the first and second cam surfaces 133A and 133B are aligned over the first and second cam follower surfaces 122A and 122B of the cam followers 119A and 119B, respectively, of the stopper 110. The rod 140 of the actuating member 130 is situated within an actuating member opening 25 (also referred to as a "button tunnel") in a rear portion 20 (see FIGS. 10 and 12) of the main body 12 formed by a circumferential wall 26 (or actuating member opening wall). As shown in FIG. 10, the venting wiper seal member 28 is disposed around the base portion 140A of the rod 140 and inward of the circumferential wall 26 inside the button tunnel 25 to provide a fluid-tight seal between the environment and the hollow interior region 36 of the main body 12 when positioned in the button tunnel 25. In turn, the button 30 is coupled to the button coupling portion 140B of the rod 140 of the actuating member 130 (e.g., by a press fit) to allow a user to actuate the actuating member by pressing inward on the button, either directly or by pressing on the lever 180 as described below. A button biasing member 32 (e.g., a spring) is positioned over the circumferential wall 26 in a space 34 between the wall 26 and a surrounding outer wall 24 forming a recess in the rear portion 20 of the main body 12. The button biasing member 32 is operative to bias the button 30 and the actuating member 130 coupled thereto to the outward position shown in FIG. 11A which corresponds to the closed position of the stopper 110 and tends to move the actuating member 130 toward that position.

In operation, a user may cause the button 30 to be moved inward which in turn causes the actuating member 130 to be displaced in an inward, substantially horizontal direction (from the right to the left in the views shown in FIGS. 11A and 11B). As the actuating member 130 is displaced, the first and second cam surfaces 133A and 133B of the actuating member 130 slidably engage the surfaces 122A and 122B of the first and second cam followers 119A and 119B, respectively, of the stopper 110. Since the first and second cam surfaces 133A and 133B each slope downward from the distal end 134 toward the proximal end 132 of the actuating member 130, the surfaces of the first and second cam followers 119A and 119B (and thus the stopper 110) are moved in a downward direction as the actuating member 130 is displaced inward, as shown in FIG. 11B.

As the stopper 110 is moved in a downward direction, a gap 38 (see FIG. 11B) is formed between the stopper seal 102 and the stopper seal engagement portion 68 of the main body 12 such that fluid may pass through the drinking opening 64. Additionally, as the actuating member 130 is displaced inward, the wiper seal member 28 exits the button tunnel 25, which provides a passage between the outer environment and the hollow interior portion 36 of the main body 12. The timing of the operation of the sealing members 28, 102, and 117 is discussed below in the section describing the venting mechanism.

It should be appreciated that although in this embodiment the actuating member 130 includes the cam surfaces 133A and 133B and the stopper 110 includes the cam followers 119A and 119B, in other embodiments the actuating member 130 may include one or more cam followers and the stopper 110 may include one or more corresponding cam surfaces.

Actuating Lever

As discussed above, the lid 10 also comprises the selectively rotatable, exterior actuating lever 180 pivotally engaged with the upper portion 14 of the main body 12. In some embodiments, the lever 180 is selectively rotatable between a cover position (see FIGS. 1-7) and an actuating position (see FIGS. 8A-D). In other embodiments, the lever 180 may be pivotally coupled to the main body 12 but is not movable into a position wherein it covers the drinking opening 64. The lever 180 includes, an upper surface 182 (facing upward when in the cover position, and laterally inward in the actuating position), a bottom surface 185 (facing downward when in the cover position, but laterally outward in the actuating position, see FIG. 8A), a forward portion 184, and a lid coupling portion 186. The lid coupling portion 186 is configured to receive a pin 183 through an aperture that extends between lever coupling portions 75A and 75B of the lid 10. The pin 183 also extends through apertures 76A and 76B in the lever coupling portions 75A and 75B, respectively, to form a hinge 191 (see FIGS. 8A-8D) between the lid 10 and the lever 180.

Figure 2:
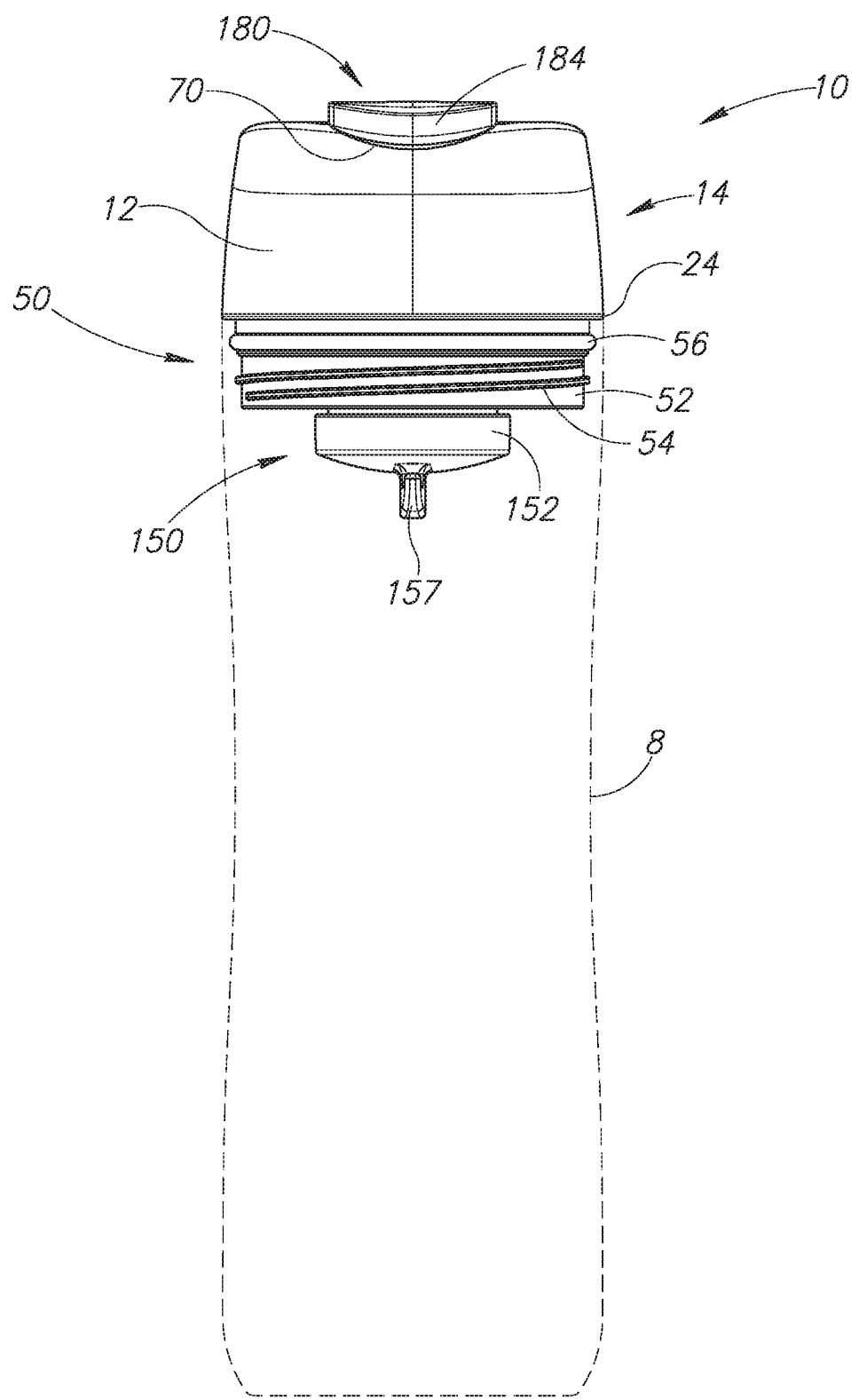
FIG. 2 is a front elevational view of the beverage container closure of FIG. 1.
Figure 3:
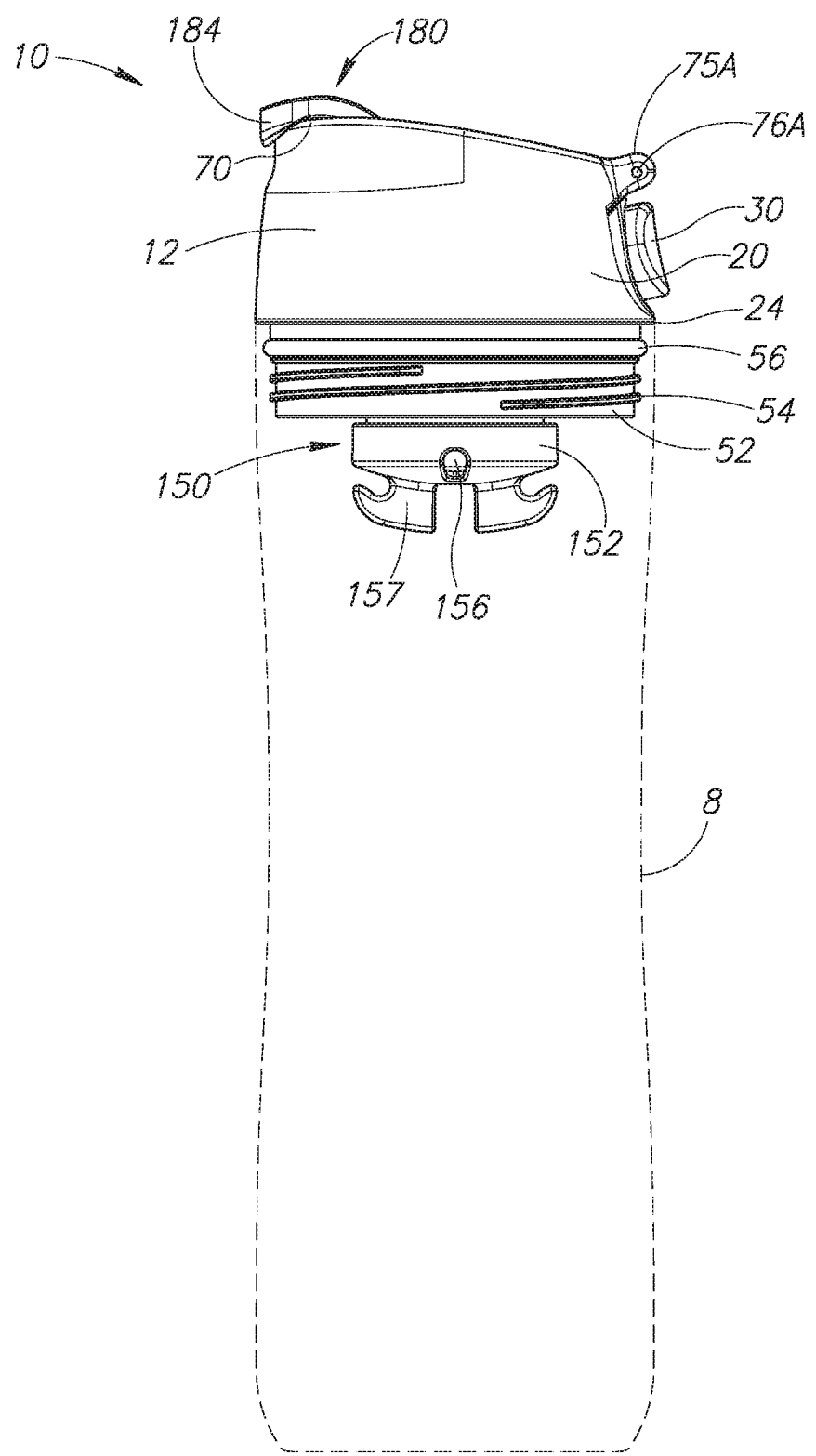
FIG. 3 is a right side elevational view of the beverage container closure of FIG. 1.
Figure 4:
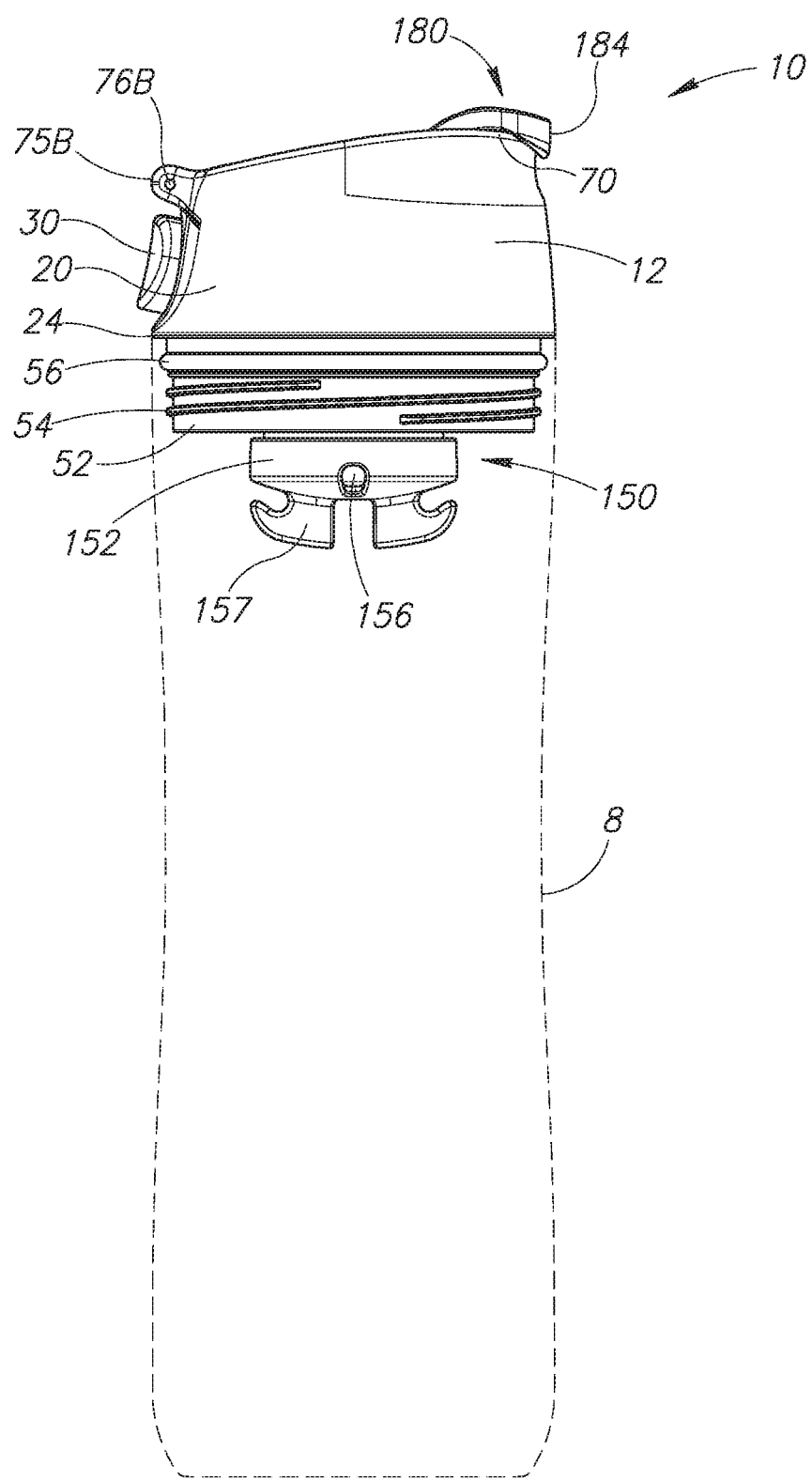
FIG. 4 is a left side elevational view of the beverage container closure of FIG. 1.
Figure 5:
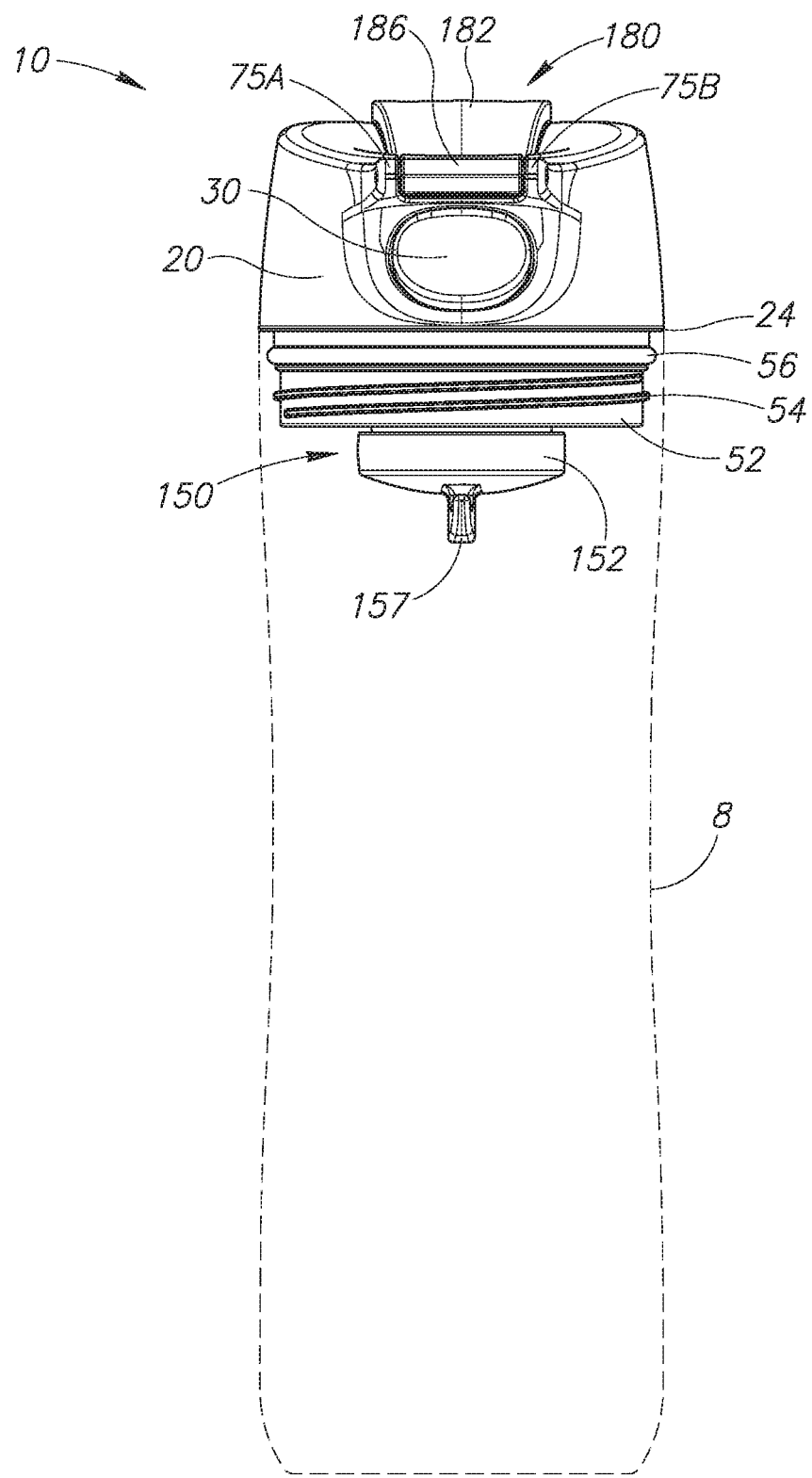
FIG. 5 is a rear elevational view of the beverage container closure of FIG. 1.
Figure 6:
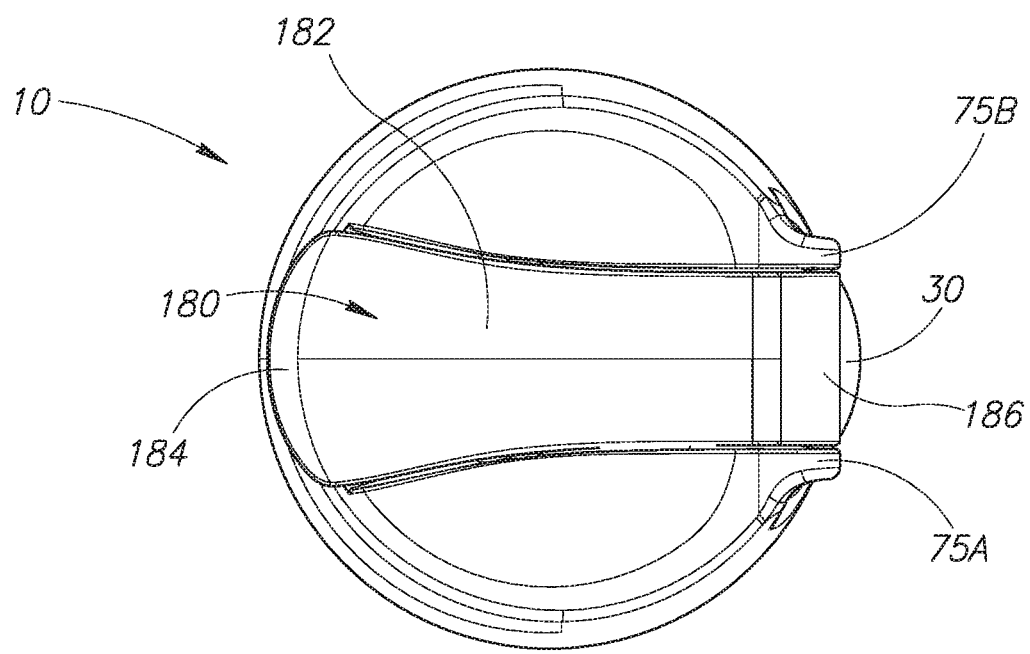
FIG. 6 is a top plan view of the beverage container closure of FIG. 1.
Figure 7:
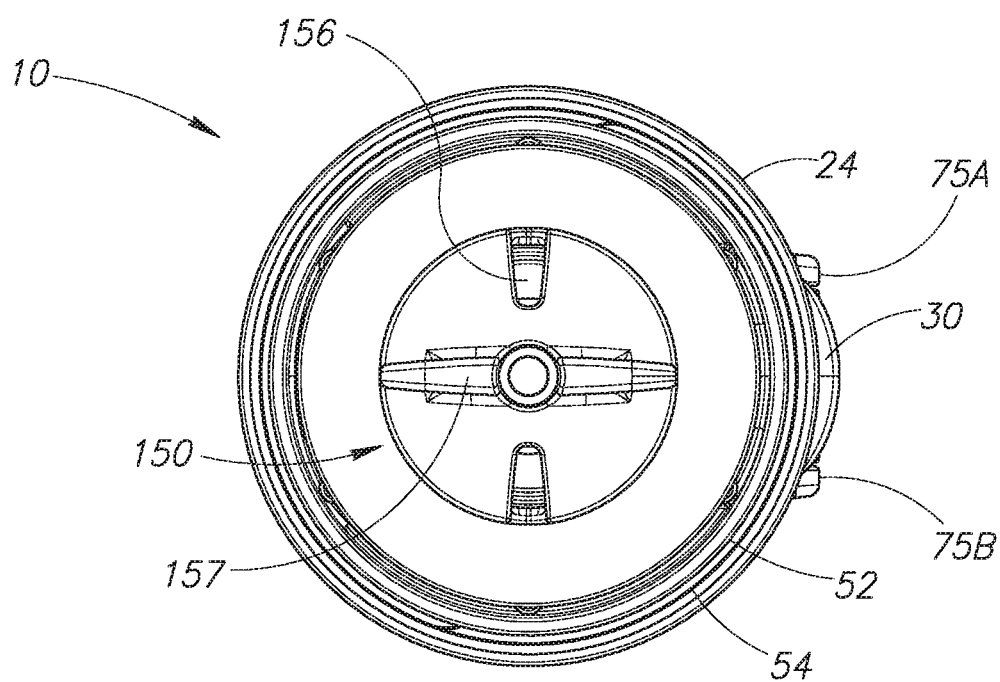
FIG. 7 is a bottom plan view of the beverage container closure of FIG. 1.

When in the cover position shown in FIGS. 1-7, the lever 180 is positioned partially within a recessed portion 63 in the lid and between inner sidewalls 71A and 71B (see FIGS. 8A and 12). Thus, when the lever 180 in the cover position, the upper-most surface of the lid 10 is formed by a right upper surface 73A, the upper surface 182 of the lever 180, and a left upper surface 73B. When in the cover position, the lever 180 is positioned over and is operative to cover the opening 64 when a user is not in the process of drinking a beverage. As shown in FIGS. 2-4, the forward portion 184 is disposed over the forward lip portion 70 when in the cover position. The inner sidewalls 71A and 71B include respective detents or recesses 67A and 67B (see FIGS. 8A and 12) configured to releasably receive corresponding protrusions 181A and 181B disposed on the lever 180. The protrusions 181A and 181B may be somewhat flexible so that they compress inward for engagement with the recesses 67A and 67B, respectively, followed by return toward their original position or shape to accomplish the interference required to latch the lever 180 to the main body 12 of the lid 10. This "snap fit" feature is useful because it allows the lever 180 to be selectively and releasably latched to the lid 10 in the cover position without requiring any screws, clips, adhesives, or other joining methods. That is, the protrusions 67A and 67B and the recesses 181A and 181B are molded into the main body 12 and the lever 180, respectively, so additional parts are not needed to join them together.

Figure 8C:
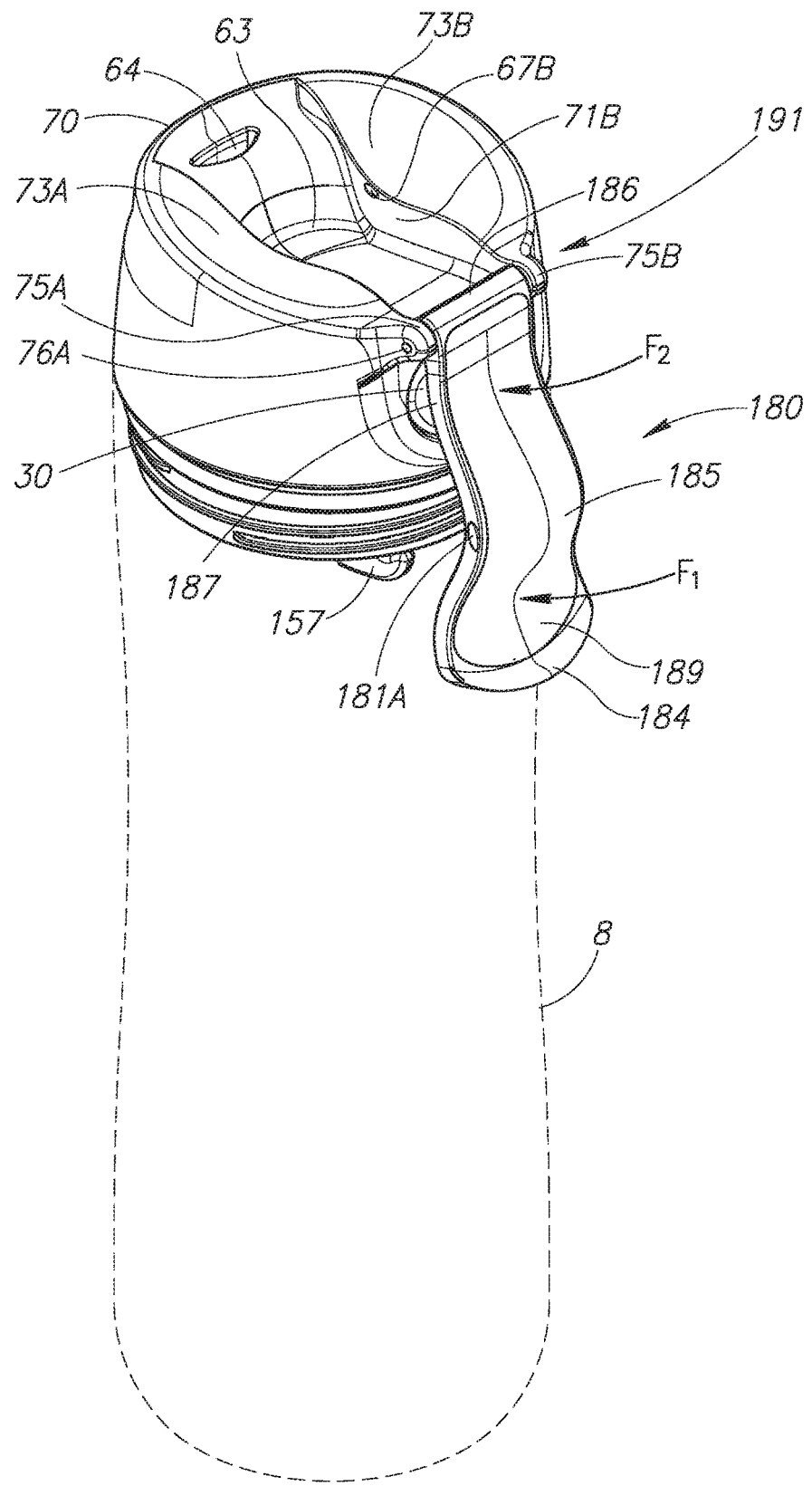
FIG. 8C is a top right side perspective view of the beverage container closure of FIG. 1 when the lever is pressed inward by a user, which causes a stopper of the beverage container closure to move into an open position.
Figure 8D:
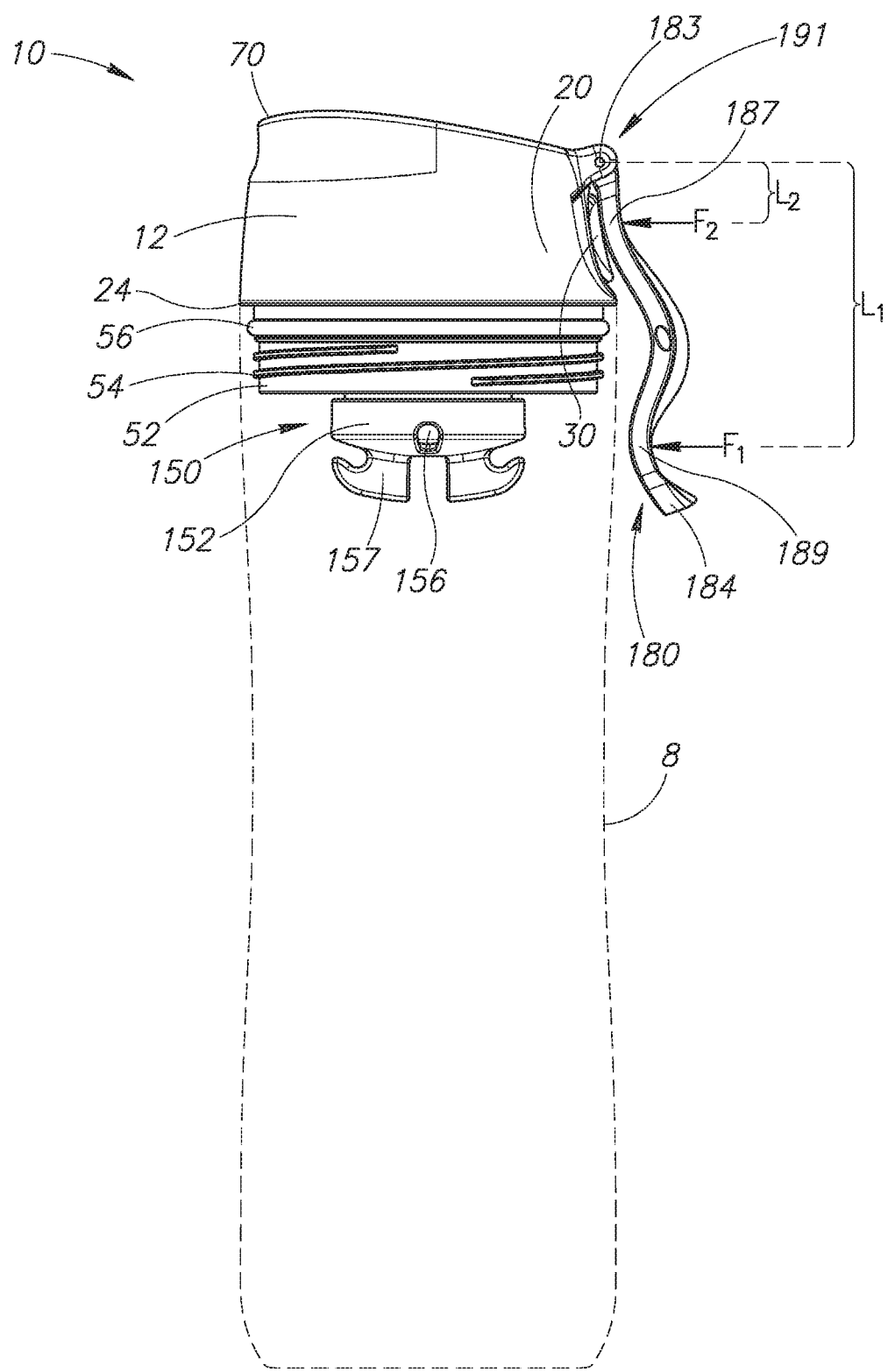
FIG. 8D is a right side elevational view of the beverage container as shown in FIG. 8C.
Figure 9:
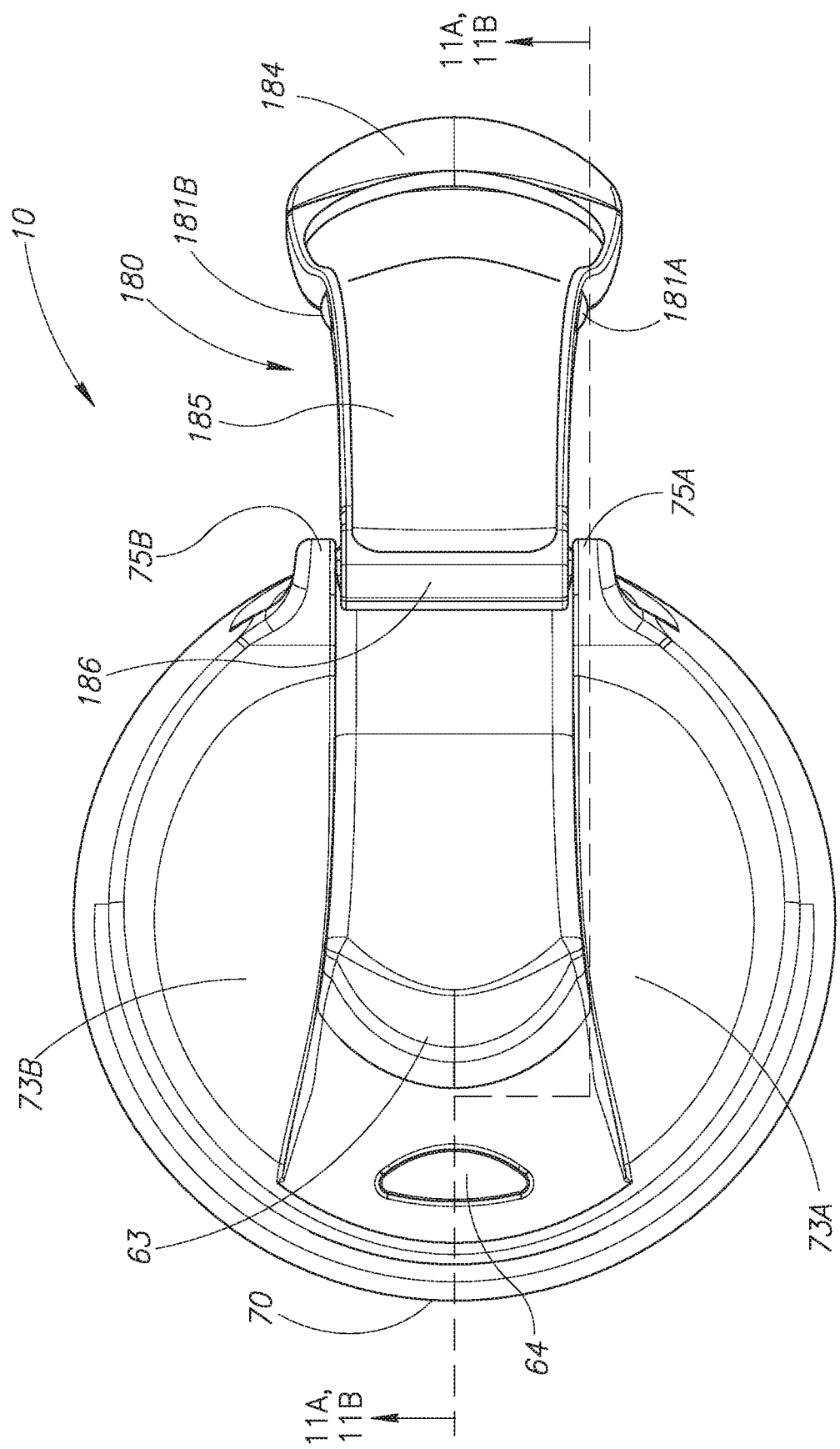
FIG. 9 is an enlarged top plan view of the beverage container closure of FIG. 8A.

In operation, a user may selectively rotate the lever 180 from the cover position (see FIGS. 8A and 8B) to the actuating position (see FIGS. 8C and 8D) wherein the lever does not cover the opening 64. In the actuating position of FIGS. 8C and 8D, the user may apply a force ($F_1$) to the lever 180 at a user force application portion 189, which causes a button contact portion 187 of the lever positioned between the pin 183 of the lid coupling portion 186 and the user force application portion to apply a laterally inward force ($F_2$) to move the button 30 laterally inward so that the user may operate the lid 10 to drink a beverage or other fluid housed in the container 8 to which the lid is attached. This position is depicted in FIGS. 8C and 8D, which show that a user applies the force ($F_1$) to the force application portion 189 to move the lever 180 laterally inward toward the body of the beverage container 8. Since the force application portion 189 of the lever 180 is positioned at a location where a user would normally hold the beverage container 8, the user can easily operate the lever by using a finger to "squeeze" the lever toward the beverage container.

As shown in FIG. 8D, the lever 180 provides a mechanical advantage that enables the user to actuate the stopper 110 using less force than is required by directly depressing the button 30. The hinge 191 and the lever 180 form a "Class 2 lever" that amplifies the force ($F_1$) applied by the user at the user force application portion 189 into the force ($F_2$) applied to the button 30 at the button contact portion 187. As will be appreciated, this occurs because the distance ($L_1$) between the user force application portion 189 of the lever 180 and the pin 183 of the hinge 191 is greater than the distance ($L_2$) between the button contact portion 187 and the hinge pin. More specifically, the mechanical advantage (MA) provided by the lever 180 is approximately equal to the length ($L_1$) divided by the length ($L_2$), or MA=$L_1/L_2$. In the illustrated embodiment, the lever 180 is configured such that the force ($F_2$) applied to the button 30 is approximately four times greater than the force ($F_1$) applied by the user (i.e., $L_1 \approx 4L_2$). As discussed above, this feature is especially advantageous for users that are not able or do not wish to use a relatively large amount of force to open the stopper 110 of the beverage container closure 10.

Venting Mechanism

As discussed above, when a hot liquid (e.g., coffee, tea, etc.) is stored in the beverage container 8 with the lid 10 secured thereto so that a seal is formed between the interior of the beverage container and the exterior environment, the pressure inside the beverage container may build. Due to this pressure, there is a potential for hot liquid or gas to spray or otherwise be expelled from the drinking opening 64 in the lid 10 when it is opened by a user (e.g., when drinking from the beverage container 8). To prevent this, in some embodiments, the vent seal 28, the button tunnel 25, the actuating member 130, and the stopper 110 are configured to together provide a venting mechanism (referenced generally by the numeral 200 in FIG. 13B) that prevents the spray of liquid or gas from the drinking opening 64 of the lid 10 when the lid is opened by a user.

Figure 13A:
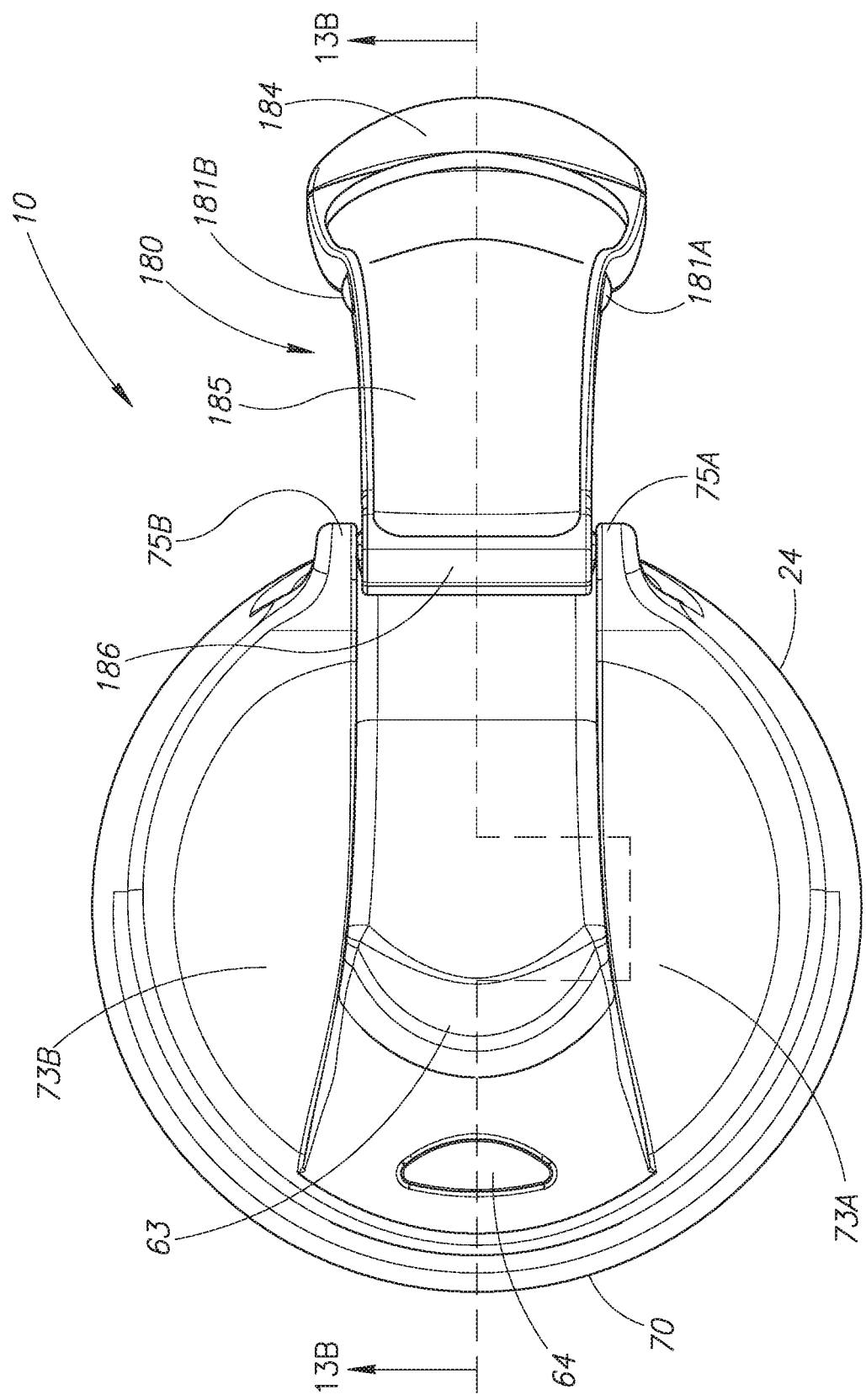
FIG. 13A is an enlarged top plan view of the beverage container closure of FIG. 8A.
Figure 13B:
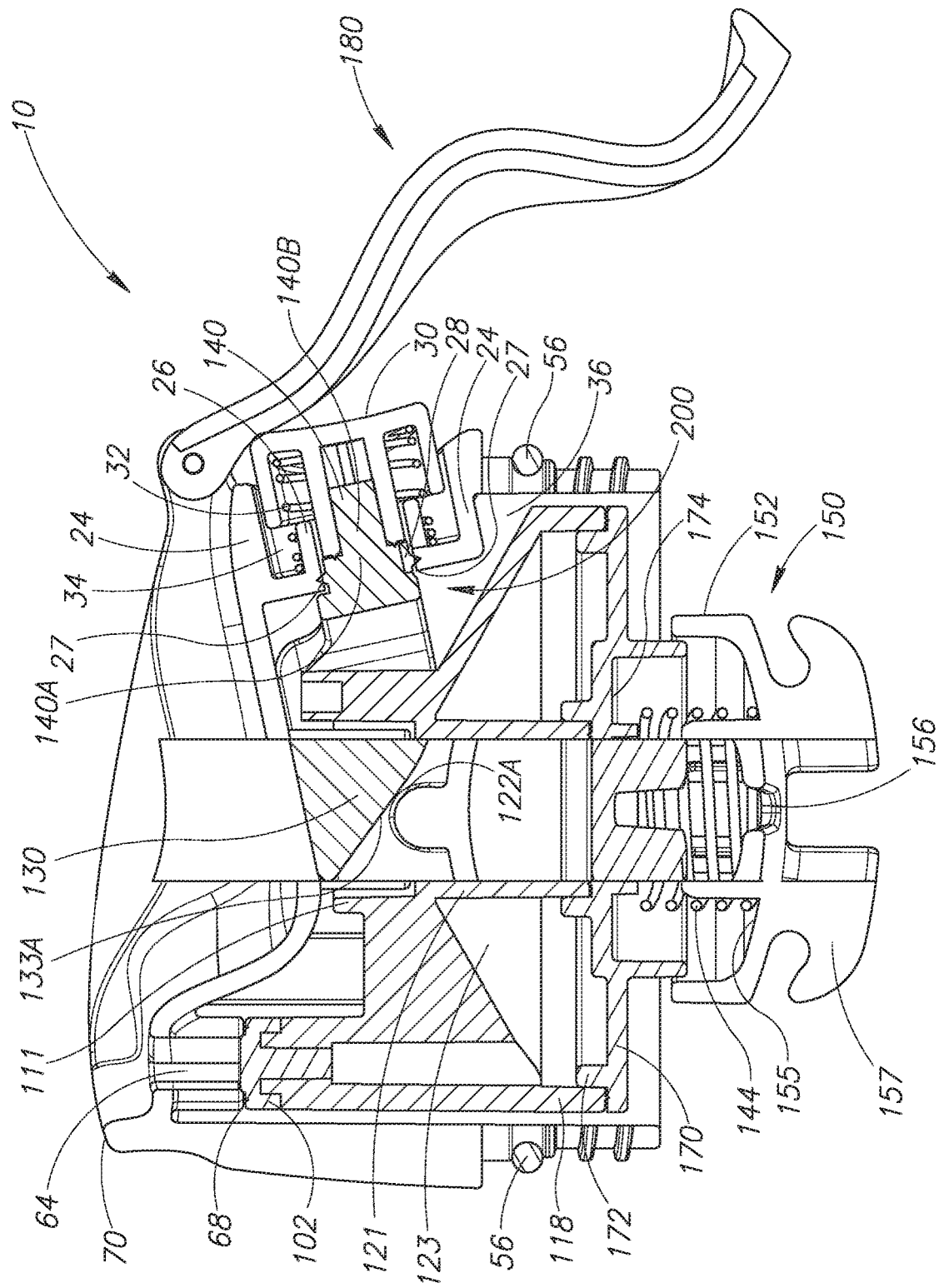
FIG. 13B is a sectional view taken substantially along the line 13B-13B of FIG. 13A with no force being applied to the lever so that the stopper and a vent seal of the beverage container closure are in a sealed position.
Figure 13C:
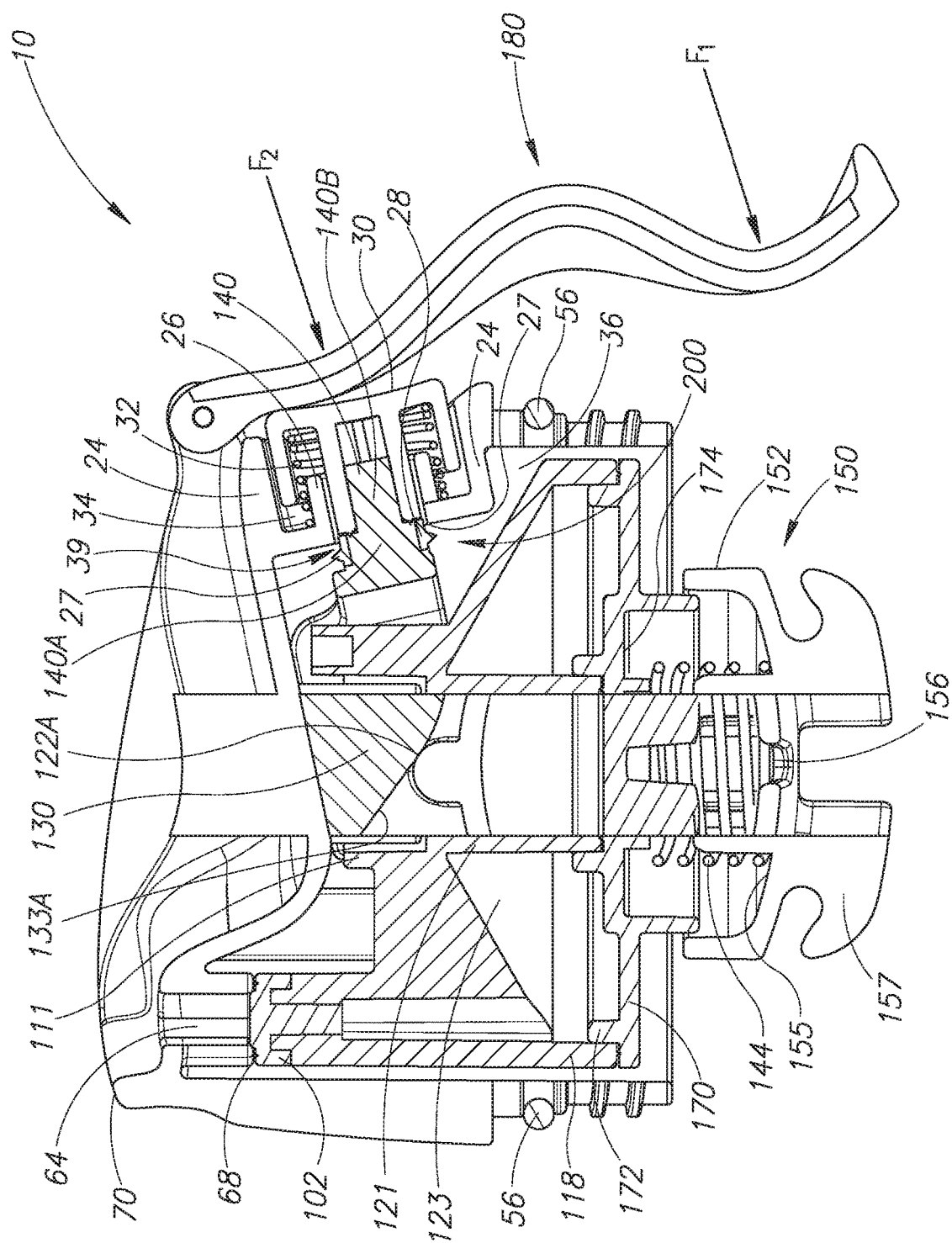
FIG. 13C is a sectional view taken substantially along the line 13B-13B of FIG. 13A when a user has begun applying a force to the lever sufficient to move vent seal into an open position but the stopper remains in the sealed position.
Figure 13D:
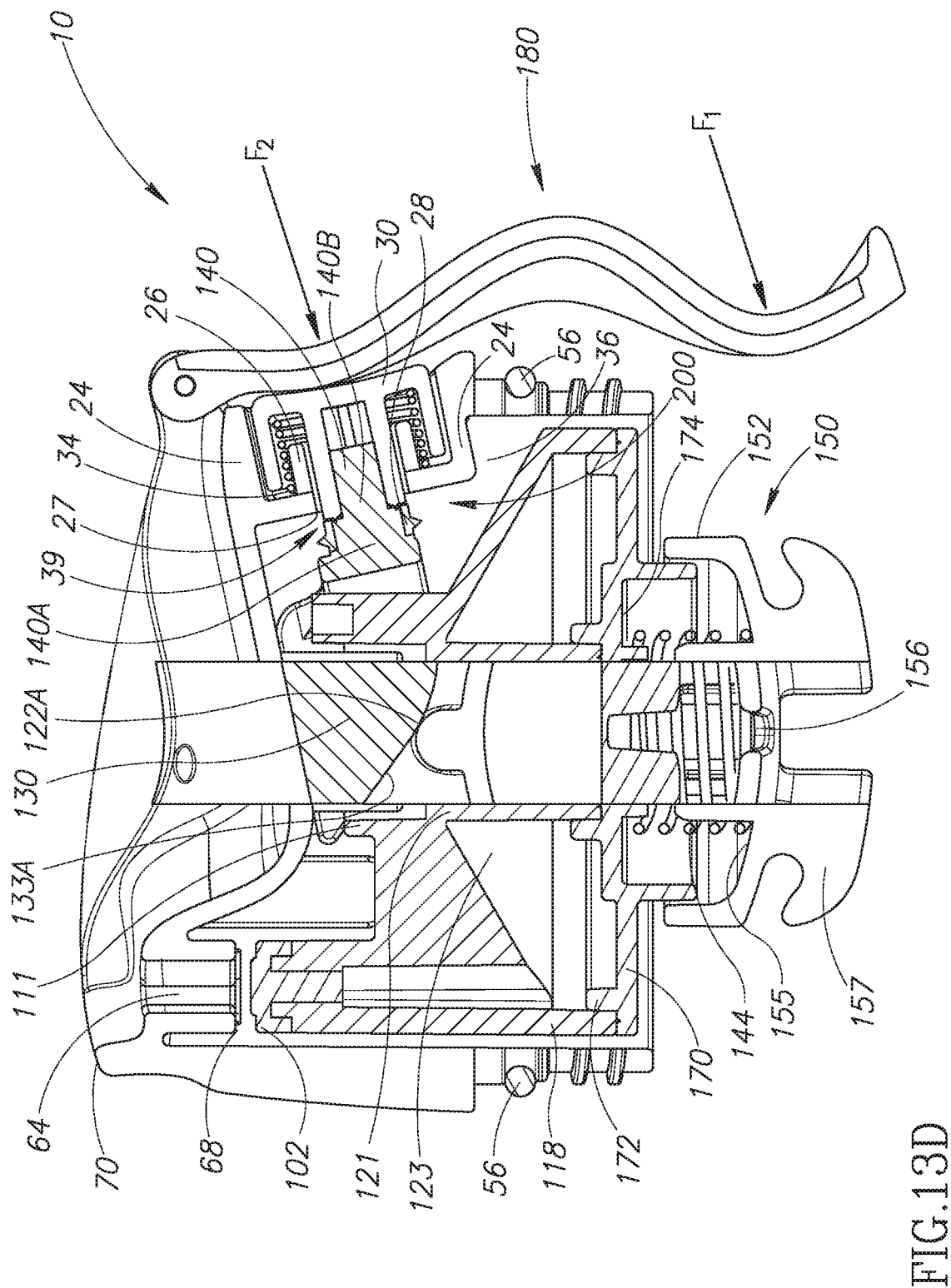
FIG. 13D is a sectional view taken substantially along the line 13B-13B of FIG. 13A when a user has applied a force to the lever sufficient to move the stopper and the vent seal into an open position as shown in FIGS. 8C and 8D.

The operation of the venting mechanism 200 is now described with reference to FIGS. 13B, 13C, and 13D, which show sectional views of the lid 10 taken substantially along the line 13B-13B of FIG. 13A, when the button 30 is not depressed by a user applying a force to the lever 180 (FIG. 13B), when the button is partially depressed (FIG. 13C), and when the button is fully depressed (FIG. 13D). In FIG. 13B, the vent seal 28 and the stopper 110 are both in a sealed position. In FIG. 13C, the vent seal 28 is in a venting or open position, and the stopper 110 remains in the sealed position. In FIG. 13D, the vent seal 28 and the stopper 110 are both in the open position.

As shown in FIG. 13B, when the button 30 is not being depressed by the lever 180, the stopper seal 102 is in contact with the stopper seal engagement portion 68 that defines the drinking opening 64 of the main body 12. In this regard, when the stopper 100 is in the closed position shown in FIG. 13B, the stopper seal 102 is pressed against the stopper seal engagement portion 68 of the main body 12 by the biasing member 144 to provide a fluid-tight seal between the container 8 to which the lid 10 is attached and the environment. Further, the vent seal 28 is disposed around the base portion 140A of the rod 140 and outward of an innermost edge 27 of the circumferential wall 26, such that it is positioned inside the button tunnel 25 to provide a fluid-tight seal between the environment and the hollow interior region 36 of the main body 12.

FIG. 13C depicts the lid 10 when the button 30 is partially depressed. As can be appreciated, the button 30 may be moved into this partially depressed position of FIG. 13C as a user moves the lever 180 between the non-depressed position shown in FIG. 13B and the fully depressed position shown in FIG. 13D. In this partially depressed position, the vent seal 28 has been displaced inward by a sufficient amount so that it is positioned inward of the edge 27 of the circumferential wall 26, outside the button tunnel 25, such that an air gap 39 is formed that allows for the passage of air between the outer environment and the hollow interior portion 36 of the main body 12.

It is noted that the actuating member 130 is configured such that the first and second cam surfaces 133A and 133B are aligned over the surfaces surface 122A of the cam follower 119A and the surface 122B of the cam follower 119B of the first and second cam follower 119A and 119B, respectively, in a manner such that the first and second cam surfaces do not engage the first and second cam follower surfaces, respectively, to move the stopper 110 in a downward direction until the button 30 has been moved inward sufficiently for the vent seal 28 to exit the button tunnel 25 and for the air gap 39 to be formed. Thus, during operation when a user depresses the lever 180 to move the button 30 inward, the vent seal 28 is opened before the drinking opening 64 is opened. Accordingly, any pressure that has built up within the beverage container 8 will be released through the air gap 39 when the user depresses the lever 180. This configuration prevents the possibility of air or liquid being expelled or sprayed out of the drinking opening 64, since the drinking opening is only opened after the air gap 39 has formed and the pressure within the container has equalized.

FIG. 13D illustrates the condition when a user has fully depressed the lever 180, which causes the actuating member 130 to be displaced even further than shown in FIG. 13C in an inward, substantially horizontal direction. As the actuating member 130 is displaced, the first and second cam surfaces 133A and 133B of the actuating member 130 slidably engage the surfaces 122A and 122B of the first and second cam followers 119A and 119B, respectively, as described above. As the stopper 110 is moved in a downward direction, the gap 38 is formed between the stopper seal 102 and the stopper seal engagement portion 68 of the main body 12 such that fluid may pass through the drinking opening 64 when the beverage container 8 is tilted. As shown, the air gap 39 is also present when the button 30 is in the fully depressed position shown in FIG. 13D. In additional to providing venting capability immediately when the lid 10 is first opened by a user, the air gap 39 also allows fluid to pass through the drinking opening 64 more freely as the user drinks from the beverage container 8.

As can be appreciated, the assembly described above may be disassembled by a user for cleaning if desired. As may best be viewed in FIGS. 10 and 12, a user may simply unscrew the stopper cover 150 from the stopper cover engagement portion 22 of the main body 12 using the handles 157, which will release the stopper 110 and the stopper cap 170, the stopper cover 150, and the stopper biasing member 144 from the hollow interior region 36 of the main body. Once these components have been cleaned, the user may then reassemble the lid 10 by first inserting the stopper 110 back into the hollow interior region 36 of the main body 12. Then, the user may position the stopper-biasing member 144 over the rod 161 of the stopper cover 150, and threadably connect the engagement portion 162 of the stopper cover with the stopper cover engagement portion 22 of the main body 12, thereby securing the stopper 110 within the hollow interior portion 36 of the main body.

Further, since both the actuating member 130 and the stopper 110 are biased by the button-biasing member 32 and the stopper-biasing member 144, respectively, the stopper 110 automatically returns to the sealed or closed position (shown in FIG. 13B) once the user removes pressure from the lever 180. In this regard, the user may open and drink from the beverage container 8 shown in FIG. 1 to which the lid 10 is attached using one hand by simply pressing the lever 180 inward with a finger of the hand holding the container while consuming a beverage and releasing the lever thereafter to automatically reseal the container. As can be appreciated, the ability to open, drink from, and close a container using only one hand may be desirable for various active users including bicyclists, hikers, drivers, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A drinking container for use by a user, comprising:
a drinking container body having a container cavity with an open upper end, the container boding having a generally longitudinal axis;
a removable drinking container body lid covering the upper end of the container cavity, the lid having a drink aperture and a vent aperture;
a trigger assembly controlling fluid communication between the container cavity and the drink aperture and vent aperture, the trigger assembly having a button member movable by the user in a direction transverse to the container body longitudinal axis to actuate opening of the drink aperture to allow fluid communication between the container cavity and the drink aperture and to actuate opening of the vent aperture to allow fluid communication between the container cavity and the vent aperture;
a lever rotatably coupled to the lid, in a first lever position the lever is in engagement with the button member and is inwardly moveable therefrom to apply an inward force on the button member to move the button member sufficient to actuate opening of the drink aperture and the vent aperture; and
a stopper movably coupled to the lid and configured for upward displacement into a closed position whereat the stopper closes the drink aperture to prevent fluid passage therethrough, and downward displacement into an opened position whereat the stopper opens the drink aperture to allow fluid passage through the drink aperture, the stopper having a stopper engagement portion comprising one of a cam surface and a cam follower, and the trigger assembly having an actuating member engagement portion comprising the other of the cam surface and the cam follower, the actuating member engagement portion being positioned to slidably engage the stopper engagement portion during inward movement of the button member to cause the actuating member engagement portion to move the stopper engagement portion downward which moves the stopper to the opened position, and being positioned such that during outward movement of the button member the actuating member engagement portion permits the stopper engagement portion to move upward which moves the stopper to the closed position.

2. The drink container of claim 1, wherein the lever is outwardly rotatably movable from the first lever position to a second lever position whereat the lever is out of engagement with the button member.

3. The drink container of claim 2, wherein in the second lever position the lever extends transverse to the container body longitudinal axis.

4. The drink container of claim 1, wherein the lever is outwardly rotatably movable from the first lever position to a second lever position whereat the lever is out of engagement with the button member and positioned to permit the button member to be moved inward by the hand of the user.

5. The drink container of claim 1, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

6. The drink container of claim 1, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly being operatively connected to the vent aperture seal to move the vent aperture seal from the first seal position to the second seal position in response to inward movement of the button member.

7. The drink container of claim 1, wherein the lid has a downwardly opening hollow interior body region and the stopper is at least partially positioned within the hollow interior body region, the stopper having a stopper base portion and a stopper sealing portion extending upward from the stopper base portion, the stopper sealing portion has an upper end portion with a seal positioned to close the drink aperture when the stopper is in the closed position and to open the drink aperture when the stopper is in the opened position.

8. The drink container of claim 1, wherein the stopper engagement portion is a first engagement portion of the stopper and the stopper further includes a second engagement portion comprising one of a cam and a cam follower, and the actuating member engagement portion is a first engagement portion of the trigger assembly and the trigger assembly further includes a second engagement portion comprising one of a cam and a cam follower, the first engagement portion of the trigger assembly being arranged to engage the first engagement portion of the stopper and apply a downwardly directed operating first force to the first engagement portion of the stopper during inward movement of the button member to cause the first engagement portion of the trigger assembly to move the first engagement portion of the stopper downward and thereby move the stopper sealing portion toward the opened position, and the second engagement portion of the trigger assembly being arranged to engage the second engagement portion of the stopper and apply a downwardly directed operating second force to the second engagement portion of the stopper during inward movement of the button member to cause the second engagement portion of the trigger assembly to move the second engagement portion of the stopper downward and thereby move the stopper sealing portion toward the opened position.

9. The drink container of claim 8, wherein the first and second engagement portions of the trigger assembly being positioned such that during outward movement of the button member the first and second engagement portions of the trigger assembly permit the first and second engagement portions of the stopper to move upward which moves the stopper to the closed position.

10. The drink container of claim 8, wherein the first and second engagement portions of the stopper are laterally spaced apart from each other on opposite sides of the container body longitudinal axis, and the first and second engagement portions of the trigger assembly are laterally spaced apart from each other on opposite sides of the container body longitudinal axis.

11. The drink container of claim 8, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

12. The drink container of claim 8, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly being operatively connected to the vent aperture seal to move the vent aperture seal from the first seal position to the second seal position in response to inward movement of the button member.

13. The drink container of claim 8, wherein the lid has a downwardly opening hollow interior body region and the stopper is at least partially positioned within the hollow interior body region, the stopper having a stopper base portion and a stopper sealing portion extending upward from the stopper base portion, and the stopper sealing portion has an upper end portion with a seal positioned to close the drink aperture when the stopper is in the closed position and to open the drink aperture when the stopper is in the opened position.

14. The drink container of claim 1, wherein the lid has a downwardly opening hollow interior body region and the stopper is at least partially positioned within the hollow interior body region, the stopper having a stopper base portion and a stopper sealing portion extending upward from the stopper base portion.

15. The drink container of claim 14, wherein the stopper sealing portion has an upper end portion with a seal positioned to close the drink aperture when the stopper is in the closed position and to open the drink aperture when the stopper is in the opened position.

16. The drink container of claim 14, wherein the stopper sealing portion and the stopper base portion are movable together as a unit between the stopper closed and opened positions.

17. The drink container of claim 14, further including an axially extending stopper biasing member coupled to the stopper, the stopper biasing member applying an axially upward biasing force to the stopper to bias the stopper toward the closed position, the stopper biasing member being disconnectable from the stopper, and when disconnected from the stopper, the stopper being fully separable from the lid.

18. The drink container of claim 17, wherein the stopper biasing member applies a biasing force to the button member tending to move the button member in an outward direction.

19. The drink container of claim 14, wherein the stopper base portion at least partially blocks the flow of fluid through the hollow interior body region of the lid.

20. The drink container of claim 19, wherein the hollow interior body region of the lid has a lower end portion defining an open lower end of the hollow interior body region, and the stopper base portion spans across the open lower end and has a perimeter portion located adjacent to the lower end portion.

21. The drink container of claim 1, wherein the stopper has a stopper base portion and a stopper sealing portion extending upward from the stopper base portion, the stopper sealing portion having an upper end portion with a seal positioned to close the drink aperture when the stopper is in the closed position and to open the drink aperture when the stopper is in the opened position.

22. The drink container of claim 21, wherein the stopper base and stopper sealing portion are rigidly connected together and move as a unit.

23. The drink container of claim 21, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

24. The drink container of claim 21, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture, the trigger assembly being operatively connected to the vent aperture seal to move the vent aperture seal from the first seal position to the second seal position in response to inward movement of the button member.

25. The drink container of claim 1, wherein the inward force on the button member first actuates opening of the vent aperture and after opening of the vent aperture next actuates opening of the drink aperture.

26. The drink container of claim 1, further including a vent aperture seal movable between a first seal position and a second seal position, and a lid wall with a wall opening, in the first seal position the vent aperture seal closes the vent aperture and in the second seal position the vent aperture seal opens the vent aperture to allow fluid communication between the container cavity and the vent aperture.

27. The drink container of claim 26, wherein the trigger assembly has an actuator member extending through the wall opening and operatively connected to the vent aperture seal, the button member being operatively connected to the actuator member with inward movement of the button member causing the actuator member to move inward and move the vent aperture seal from the first seal position to the second seal position.

28. The drinking container of claim 1, wherein the lid has an upper wall and a sidewall extending downward from and at least partially around the upper wall, the vent aperture being located in the sidewall.

29. The drink container of claim 28, further including a vent aperture seal movable between a first seal position and a second seal position, in the first seal position the vent aperture seal closes the vent aperture and in the second seal position the vent aperture seal opens the vent aperture to allow fluid communication between the container cavity and the vent aperture.

30. The drink container of claim 29, wherein the trigger assembly has an actuator member extending through a wall opening in the lid and operatively connected to the vent aperture seal, the button member being operatively connected to the actuator member with inward movement of the button member causing the actuator member to move inward and move the vent aperture seal from the first seal position to the second seal position.

31. The drink container of claim 1, wherein the lever has a first lever end portion rotatably connected to the lid and a free second lever end portion, and the lever is outwardly rotatably movable from the first lever position to a second lever position whereat the lever is out of engagement with the button member and the second lever end portion is positioned above the lid.

32. The drink container of claim 1, wherein the lever has a first lever end portion rotatably connected to the lid and a free second lever end portion, and the lever is outwardly rotatably movable from the first lever position to a second lever position whereat the lever is rotated to position the lever sufficiently clear of the button member to permit manual operation of the button member.

33. The drink container of claim 1, wherein, when a first force is applied to the lever, the lever is operative to apply a second force to the button member to cause the button member to move inward.

34. A lid for use with a drinking container containing a liquid and operable by a hand of a user, comprising:
 a lid body couplable to the drinking container and having a drink aperture and a vent aperture;
 a trigger assembly controlling fluid flow through the drink aperture and vent aperture, the trigger assembly having a button member movable inward by the user to actuate opening of the drink aperture and opening of the vent aperture;

a lever rotatably coupled to the lid body, in a first lever position the lever is in engagement with the button member and is inwardly moveable therefrom to apply an inward force on the button member to move the button member sufficient to actuate opening of the drink aperture and the vent aperture; and wherein the lever is outwardly rotatably movable from the first lever position to a second lever position whereat the lever is out of engagement with the button member, and in the second lever position the lever extends transverse to the container body longitudinal axis.

35. A lid for use with a drinking container containing a liquid and operable by a hand of a user, comprising:

a lid body couplable to the drinking container and having a drink aperture and a vent aperture;

a trigger assembly controlling fluid flow through the drink aperture and vent aperture, the trigger assembly having a button member movable inward by the user to actuate opening of the drink aperture and opening of the vent aperture;

a lever rotatably coupled to the lid body, in a first lever position the lever is in engagement with the button member and is inwardly moveable therefrom to apply an inward force on the button member to move the button member sufficient to actuate opening of the drink aperture and the vent aperture; and wherein the lever is outwardly rotatably movable from the first lever position to a second lever position whereat the lever is out of engagement with the button member and positioned to permit the button member to be moved inward by the hand of the user.

36. A lid for use with a drinking container containing a liquid and operable by a hand of a user, comprising:

a lid body couplable to the drinking container and having a drink aperture and a vent aperture;

a trigger assembly controlling fluid flow through the drink aperture and vent aperture, the trigger assembly having a button member movable inward by the user to actuate opening of the drink aperture and opening of the vent aperture;

a lever rotatably coupled to the lid body, in a first lever position the lever is in engagement with the button member and is inwardly moveable therefrom to apply an inward force on the button member to move the button member sufficient to actuate opening of the drink aperture and the vent aperture; and a stopper movably coupled to the lid body and configured for upward displacement into a closed position whereat the stopper closes the drink aperture, and downward displacement into an opened position whereat the stopper opens the drink aperture, the stopper having a stopper engagement portion comprising one of a cam surface and a cam follower, and the trigger assembly having an actuating member engagement portion comprising the other of the cam surface and the cam follower, the actuating member engagement portion being positioned to slidably engage the stopper engagement portion during inward movement of the button member to cause the actuating member engagement portion to move the stopper engagement portion downward which moves the stopper to the opened position, and being positioned such that during outward movement of the button member the actuating member engagement portion permits the stopper engagement portion to move upward which moves the stopper to the closed position.

37. The lid of claim 36, further including a vent aperture seal movable between a first seal position and a second seal position, in the first seal position the vent aperture seal closes the vent aperture and in the second seal position the vent aperture seal opens the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

38. The lid of claim 36, further including a vent aperture seal movable between a first seal position and a second seal position, in the first seal position the vent aperture seal closes the vent aperture and in the second seal position the vent aperture seal opens the vent aperture, the trigger assembly being operatively connected to the vent aperture seal to move the vent aperture seal from the first seal position to the second seal position in response to inward movement of the button member.

39. The lid of claim 36, wherein the lid body has a downwardly opening hollow interior body region and the stopper is at least partially positioned within the hollow interior body region, the stopper having a stopper base portion and a stopper sealing portion extending upward from the stopper base portion, the stopper sealing portion has an upper end portion with a seal positioned to close the drink aperture when the stopper is in the closed position and to open the drink aperture when the stopper is in the opened position.

40. The lid of claim 36, wherein the stopper engagement portion is a first engagement portion of the stopper and the stopper further includes a second engagement portion comprising one of a cam and a cam follower, and the actuating member engagement portion is a first engagement portion of the trigger assembly and the trigger assembly further includes a second engagement portion comprising one of a cam and a cam follower, the first engagement portion of the trigger assembly being arranged to engage the first engagement portion of the stopper and apply a downwardly directed operating first force to the first engagement portion of the stopper during inward movement of the button member to cause the first engagement portion of the trigger assembly to move the first engagement portion of the stopper downward and thereby move the stopper sealing portion toward the opened position, and the second engagement portion of the trigger assembly being arranged to engage the second engagement portion of the stopper and apply a downwardly directed operating second force to the second engagement portion of the stopper during inward movement of the button member to cause the second engagement portion of the trigger assembly to move the second engagement portion of the stopper downward and thereby move the stopper sealing portion toward the opened position.

41. The lid of claim 40, wherein the first and second engagement portions of the trigger assembly being positioned such that during outward movement of the button member the first and second engagement portions of the trigger assembly permit the first and second engagement portions of the stopper to move upward which moves the stopper to the closed position.

42. The lid of claim 40, wherein the first and second engagement portions of the stopper are laterally spaced apart from each other on opposite sides of the container body longitudinal axis, and the first and second engagement portions of the trigger assembly are laterally spaced apart from each other on opposite sides of the container body longitudinal axis.

43. The lid of claim 40, further including a vent aperture seal movable between a first seal position and a second seal position, in the first seal position the vent aperture seal closes the vent aperture and in the second seal position the vent aperture seal opens the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

44. The lid of claim 40, further including a vent aperture seal movable between a first seal position and a second seal position, in the first seal position the vent aperture seal closes the vent aperture and in the second seal position the vent aperture seal opens the vent aperture, the trigger assembly being operatively connected to the vent aperture seal to move the vent aperture seal from the first seal position to the second seal position in response to inward movement of the button member.

45. The lid of claim 40, wherein the lid body has a downwardly opening hollow interior body region and the stopper is at least partially positioned within the hollow interior body region, the stopper having a stopper base portion and a stopper sealing portion extending upward from the stopper base portion, and the stopper sealing portion has an upper end portion with a seal positioned to close the drink aperture when the stopper is in the closed position and to open the drink aperture when the stopper is in the opened position.

46. A lid for use with a drinking container containing a liquid and operable by a hand of a user, comprising:
  a lid body couplable to the drinking container and having a drink aperture and a vent aperture;
  a trigger assembly controlling fluid flow through the drink aperture and vent aperture, the trigger assembly having a button member movable inward by the user to actuate opening of the drink aperture and opening of the vent aperture;
  a lever rotatably coupled to the lid body, in a first lever position the lever is in engagement with the button member and is inwardly moveable therefrom to apply an inward force on the button member to move the button member sufficient to actuate opening of the drink aperture and the vent aperture; and
  wherein the lid body has a downwardly opening hollow interior body region and a stopper at least partially positioned within the hollow interior body region, the stopper having a stopper base portion and a stopper sealing portion extending upward from the stopper base portion, the stopper being movably coupled to the lid body and configured for upward displacement into a closed position whereat the stopper closes the drink aperture, and downward displacement into an opened position whereat the stopper opens the drink aperture.

47. The lid of claim 46, wherein the stopper sealing portion has an upper end portion with a seal positioned to close the drink aperture when the stopper is in the closed position and to open the drink aperture when the stopper is in the opened position.

48. The lid of claim 46, wherein the stopper sealing portion and the stopper base portion are movable together as a unit between the stopper closed and opened positions.

49. The lid of claim 46, further including an axially extending stopper biasing member coupled to the stopper, the stopper biasing member applying an axially upward biasing force to the stopper to bias the stopper toward the closed position, the stopper biasing member being disconnectable from the stopper, and when disconnected from the stopper, the stopper being fully separable from the lid body.

50. The lid of claim 49, wherein the stopper biasing member applies a biasing force to the button member tending to move the button member in an outward direction.

51. The lid of claim 46, wherein the stopper base portion at least partially blocks the flow of fluid through the hollow interior body region of the lid body.

52. The lid of claim 51, wherein the hollow interior body region of the lid body has a lower end portion defining an open lower end of the hollow interior body region, and the stopper base portion spans across the open lower end and has a perimeter portion located adjacent to the lower end portion.

53. A lid for use with a drinking container containing a liquid and operable by a hand of a user, comprising:
  a lid body couplable to the drinking container and having a drink aperture and a vent aperture;
  a trigger assembly controlling fluid flow through the drink aperture and vent aperture, the trigger assembly having a button member movable inward by the user to actuate opening of the drink aperture and opening of the vent aperture;
  a lever rotatably coupled to the lid body, in a first lever position the lever is in engagement with the button member and is inwardly moveable therefrom to apply an inward force on the button member to move the button member sufficient to actuate opening of the drink aperture and the vent aperture; and
  a stopper movably coupled to the lid body and configured for upward displacement into a closed position whereat the stopper closes the drink aperture, and downward displacement into an opened position whereat the stopper opens the drink aperture, the stopper having a stopper base portion and a stopper sealing portion extending upward from the stopper base portion, the stopper sealing portion having an upper end portion with a seal positioned to close the drink aperture when the stopper is in the closed position and to open the drink aperture when the stopper is in the opened position.

54. The lid of claim 53, wherein the stopper base and stopper sealing portion are rigidly connected together and move as a unit.

55. The lid of claim 53, further including a vent aperture seal movable between a first seal position and a second seal position, in the first seal position the vent aperture seal closes the vent aperture and in the second seal position the vent aperture seal opens the vent aperture, the trigger assembly has an actuator member operatively connected to the vent aperture seal, the button member being operatively connected to the actuator member with inward movement of the button member causing the actuator member to move inward and move the vent aperture seal from the first seal position to the second seal position.

56. The lid of claim 53, further including a vent aperture seal movable between a first seal position and a second seal position, in the first seal position the vent aperture seal closes the vent aperture and in the second seal position the vent aperture seal opens the vent aperture, the trigger assembly being operatively connected to the vent aperture seal to move the vent aperture seal from the first seal position to the second seal position in response to inward movement of the button member.

57. The lid of claim 34, wherein the inward force on the button member first actuates opening of the vent aperture and after opening of the vent aperture next actuates opening of the drink aperture.

58. The lid of claim 34, further including a vent aperture seal movable between a first seal position and a second seal position, and a lid wall with a wall opening, in the first seal position the vent aperture seal closes the vent aperture and in the second seal position the vent aperture seal opens the vent aperture.

59. The lid of claim 58, wherein the trigger assembly has an actuator member extending through the wall opening and operatively connected to the vent aperture seal, the button member being operatively connected to the actuator member with inward movement of the button member causing the actuator member to move inward and move the vent aperture seal from the first seal position to the second seal position.

60. The lid of claim 34, wherein the lid body has an upper wall and a sidewall extending downward from and at least partially around the upper wall, the vent aperture being located in the sidewall.

61. The lid of claim 60, further including a vent aperture seal movable between a first seal position and a second seal position, in the first seal position the vent aperture seal closes the vent aperture and in the second seal position the vent aperture seal opens the vent aperture.

62. The lid of claim 61, wherein the trigger assembly has an actuator member extending through the vent aperture and operatively connected to the vent aperture seal, the button member being operatively connected to the actuator member with inward movement of the button member causing the actuator member to move inward and move the vent aperture seal from the first seal position to the second seal position.

63. The lid of claim 34, wherein the lever has a first lever end portion rotatably connected to the lid body and a free second lever end portion, and the lever is outwardly rotatably movable from the first lever position to a second lever position whereat the lever is out of engagement with the button member and the second lever end portion is positioned above the lid body.

64. The lid of claim 34, wherein the lever has a first lever end portion rotatably connected to the lid body and a free second lever end portion, and the lever is outwardly rotatably movable from the first lever position to a second lever position whereat the lever is rotated to position the lever sufficiently clear of the button member to permit manual operation of the button member.

65. The lid of claim 34, wherein, when a first force is applied to the lever, the lever is operative to apply a second force to the button member to cause the button member to move inward.

66. A lid for use with a drinking vessel containing a liquid and operable by a hand of a user, comprising:
a lid body selectively couplable to the drinking vessel, the lid body including a drink aperture configured to permit fluid passage therethrough when the lid body is coupled to the drinking vessel and a vent aperture, the lid body having a downwardly opening interior body region;
a stopper movably coupled to the lid body and at least partially movably positioned within the hollow interior body region, the stopper being configured for upward displacement into a closed position whereat the stopper closes the drink aperture to prevent fluid passage therethrough, and downward displacement into an opened position whereat the stopper opens the drink aperture to allow fluid passage through the drink aperture, the stopper having a stopper engagement portion comprising one of a cam surface and a cam follower;
an actuating member movably coupled to the lid body and controlling fluid communication through the drink aperture and the vent aperture, the actuating member being inwardly movable by the user to actuate opening of the drink aperture and to actuate opening of the vent aperture, and being outwardly movable, the actuating member having an actuating member engagement portion comprising the other of the cam surface and the cam follower, the actuating member engagement portion being positioned to slidably engage the stopper engagement portion during inward movement of the actuating member to cause the actuating member engagement portion to move the stopper engagement portion downward which moves the stopper to the opened position, and being positioned such that during outward movement of the actuating member the actuating member engagement portion permits the stopper engagement portion to move upward which moves the stopper to the closed position; and
a lever rotatably coupled to the lid body, in a first lever position the lever is in engagement with the actuating member and is inwardly rotatably moveable therefrom to apply an inward force on the actuating member to move the actuating member sufficient to actuate opening of the drink aperture and the vent aperture.

67. The lid of claim 66, wherein the lever is outwardly rotatably movable from the first lever position to a second lever position whereat the lever is out of engagement with the actuating member and positioned to permit the actuating member to be moved inward by the hand of the user.

68. The lid of claim 66, wherein inward movement of the actuating member by the user is limited to only linear inward movement.

69. The lid of claim 66, further including a vent seal movable between a closed position closing the vent aperture and an opened position opening the vent aperture, inward movement of the actuating member moving the vent seal from the closed position to the opened position.

70. A lid for use with a drinking vessel containing a liquid and operable by a hand of a user, comprising:
a lid body selectively couplable to the drinking vessel, the lid body including a drink aperture configured to permit fluid passage therethrough when the lid body is coupled to the drinking vessel and a vent aperture;
a stopper movably coupled to the lid body and configured for upward displacement into a closed position whereat the stopper closes the drink aperture to prevent fluid passage therethrough, and downward displacement into an opened position whereat the stopper opens the drink aperture to allow fluid passage through the drink aperture, the stopper having a stopper engagement portion comprising one of a cam surface and a cam follower;
an actuating member movably coupled to the lid body and controlling fluid communication through the drink aperture and the vent aperture, the actuating member being inwardly movable by the user to actuate opening of the drink aperture and to actuate opening of the vent aperture, and being outwardly movable, the actuating member having an actuating member engagement portion comprising the other of the cam surface and the cam follower, the actuating member engagement portion being positioned to operably engage the stopper engagement portion during inward movement of the actuating member to cause the actuating member engagement portion to move the stopper engagement portion downward which moves the stopper to the opened position, and being positioned such that during outward movement of the actuating member the actuating member engagement portion permits the stopper engagement portion to move upward which moves the stopper to the closed position; and a lever rotatably coupled to the lid body, in a first lever position the lever is in engagement with the actuating member and is inwardly rotatably moveable therefrom to apply an inward force on the actuating member to move the actuating member sufficient to actuate opening of the drink aperture and the vent aperture.

71. The lid of claim 70, wherein the lever is outwardly rotatably movable from the first lever position to a second lever position whereat the lever is out of engagement with the actuating member and positioned to permit the actuating member to be moved inward by the hand of the user.

72. The lid of claim 70, wherein the lid body has a downwardly opening interior body region and the stopper and the stopper is at least partially movably positioned within the hollow interior body region.

73. The lid of claim 70, wherein the actuating member engagement portion slidably engages the stopper engagement portion during inward movement of the actuating member.

74. A lid for use with a drinking vessel containing a liquid and operable by a hand of a user, comprising:

a lid body selectively couplable to the drinking vessel, the lid body including a drink aperture configured to permit fluid passage therethrough when the lid body is coupled to the drinking vessel;

a stopper movably coupled to the lid body and configured for upward displacement into a closed position whereat the stopper closes the drink aperture to prevent fluid passage therethrough, and downward displacement into an opened position whereat the stopper opens the drink aperture to allow fluid passage through the drink aperture, the stopper having a stopper engagement portion;

an actuating member movably coupled to the lid body and controlling fluid communication through the drink aperture, the actuating member being inwardly movable by the user to actuate opening of the drink aperture, and being outwardly movable, the actuating member having an actuating member engagement portion, the actuating member engagement portion being positioned to operably engage the stopper engagement portion during inward movement of the actuating member to cause the actuating member engagement portion to move the stopper engagement portion downward which moves the stopper to the opened position, and being positioned such that during outward movement of the actuating member the actuating member engagement portion permits the stopper engagement portion to move upward which moves the stopper to the closed position; and a lever rotatably coupled to the lid body, in a first lever position the lever is in engagement with the actuating member and is inwardly rotatably moveable therefrom to apply an inward force on the actuating member to move the actuating member sufficient to actuate opening of the drink aperture and the vent aperture, the lever is outwardly rotatably movable from the first lever position to a second lever position whereat the lever is out of engagement with the actuating member and positioned to permit the actuating member to be moved inward by the hand of the user.

75. A lid for use with a drinking vessel containing a liquid and operable by a hand of a user, comprising:

a lid body selectively couplable to the drinking vessel, the lid body including a drink aperture to permit fluid passage therethrough when the lid body is coupled to the drinking vessel;

a stopper movably coupled to the lid body, the stopper being movable between a closed position whereat the stopper closes the drink aperture to prevent fluid passage therethrough, and an opened position whereat the stopper opens the drink aperture to allow fluid passage through the drink aperture;

an actuating member movably coupled to the lid body, the actuating member being inwardly movable by the user to move the stopper from the closed position to the opened position; and a lever rotatably coupled to the lid body, in a first lever position the lever is in engagement with the actuating member and is inwardly moveable therefrom to apply an inward force on the actuating member to cause the actuating member to move the stopper toward the opened position, the lever is outwardly movable from the first lever position to a second lever position whereat the lever is out of engagement with the actuating member and positioned to permit the actuating member to be moved inward by the hand of the user.

76. The lid of claim 75, wherein the rotation of the lever between the first and second positions is at least 90 degrees.

77. The lid of claim 75, wherein the lever has a free end, and in the second position of the lever the free end of the lever is above the lid body.

78. The lid of claim 75, wherein the lever has a free end and the lever is rotatable between the second position and a third position, in the third position the free end of the lever is above the lid body and overlays the drink opening.

\* \* \* \* \*